United States Patent
Evangelou et al.

(10) Patent No.: US 9,026,309 B2
(45) Date of Patent: May 5, 2015

(54) VARIABLE-GEOMETRY SUSPENSION APPARATUS AND VEHICLE COMPRISING SUCH APPARATUS

(75) Inventors: Simos Evangelou, London (GB); Caspar Kneip, Munich (DE); Daniele Dini, London (GB); Olivier De Meerschman, Gardanne (FR); Charalambos Palas, Madrid (ES); Alexandre Tocatlian, Aulnaysous-Bois (FR)

(73) Assignee: Imperial Innovations Limited, London (GB)

( * ) Notice: Subject to any disclaimer, the term of this patent is extended or adjusted under 35 U.S.C. 154(b) by 79 days.

(21) Appl. No.: 13/819,215

(22) PCT Filed: Jul. 26, 2011

(86) PCT No.: PCT/GB2011/001121
§ 371 (c)(1),
(2), (4) Date: Jun. 3, 2013

(87) PCT Pub. No.: WO2012/025705
PCT Pub. Date: Mar. 1, 2012

(65) Prior Publication Data
US 2014/0156143 A1 Jun. 5, 2014

(30) Foreign Application Priority Data
Aug. 26, 2010 (GB) .................... 1014276.8

(51) Int. Cl.
*B60G 17/018* (2006.01)
*B60G 17/015* (2006.01)
(Continued)

(52) U.S. Cl.
CPC .......... *B60G 17/018* (2013.01); *B60G 17/0157* (2013.01); *B60G 2200/132* (2013.01);
(Continued)

(58) Field of Classification Search
CPC ................ B60G 2204/424; B60G 2202/42; B60G 2204/4192; B60G 2200/132; B60G 2204/1302; B60G 17/018; B60G 25/04; B60G 2200/144; B60G 2300/12; B60G 2600/41; B60G 17/0157; B60G 2204/4193; B60G 2204/62; B60G 25/283; B60G 2204/127; B60G 2400/0523; B60G 2500/22
USPC ........ 701/36–38; 280/788, 124.109, 124.128, 280/204, 285, 286
See application file for complete search history.

(56) References Cited

U.S. PATENT DOCUMENTS

| 3,278,197 A | 10/1966 | Gerin |
| 3,858,902 A | 1/1975 | Howells et al. |

(Continued)

FOREIGN PATENT DOCUMENTS

| DE | 903661 | 2/1954 |
| DE | 3707085 | 9/1987 |

(Continued)

OTHER PUBLICATIONS

International Search Report for PCT/GB2011/001121, Completed by the European Patent Office on Oct. 3, 2011, All together 4 Pages.

*Primary Examiner* — Richard Camby
(74) *Attorney, Agent, or Firm* — Dorsey & Whitney LLP

(57) ABSTRACT

A variable-geometry suspension apparatus for a vehicle is disclosed. The apparatus having a resiliently compressible member, such as a coil-over damper, an actuator and support structure, such as a chassis of a vehicle. The resiliently compressible member is mounted to the support structure for compression under the weight of a mass suspendable by the apparatus. The compressible member is mounted with at least one end of the compressible member displaceable in a displacement direction having a component perpendicular to the direction of compression, so that such displacement varies the geometry of the suspension apparatus and thereby varies the compression of the compressible member. The actuator is arranged for displacing the end of the compressible member in the displacement direction to vary the geometry and thereby vary the compression. Applications include motor vehicles such as cars and motorcycles.

19 Claims, 23 Drawing Sheets

(51) Int. Cl.
  *B62K 25/04* (2006.01)
  *B62K 25/28* (2006.01)
(52) U.S. Cl.
  CPC ....... *B60G2200/144* (2013.01); *B60G 2202/42* (2013.01); *B60G 2204/127* (2013.01); *B60G 2204/1302* (2013.01); *B60G 2204/4192* (2013.01); *B60G 2204/4193* (2013.01); *B60G 2204/424* (2013.01); *B60G 2204/62* (2013.01); *B60G 2300/12* (2013.01); *B60G 2400/0523* (2013.01); *B60G 2500/22* (2013.01); *B60G 2600/41* (2013.01); *B62K 25/04* (2013.01); *B62K 25/283* (2013.01)

(56) References Cited

U.S. PATENT DOCUMENTS

| | | | |
|---|---|---|---|
| 4,081,187 A | | 3/1978 | Evertz et al. |
| 5,716,067 A | * | 2/1998 | van der Knaap et al. ........ 280/93.511 |
| 6,056,303 A | * | 5/2000 | van der Knaap et al. .. 280/124.1 |
| 7,281,716 B2 | * | 10/2007 | Fanson ........................ 280/5.52 |
| 7,392,978 B2 | | 7/2008 | Carlitz et al. |
| 8,356,839 B1 | * | 1/2013 | Vey ................................ 280/788 |

FOREIGN PATENT DOCUMENTS

| | | |
|---|---|---|
| DE | 3718391 | 12/1987 |
| DE | 3734724 | 7/1988 |
| DE | 3921710 | 1/1991 |
| DE | 4004133 | 8/1991 |
| DE | 4205535 | 8/1993 |
| DE | 4317510 | 12/1993 |
| DE | 19528565 | 2/1996 |
| DE | 19727819 | 1/1999 |
| DE | 19923343 | 11/2000 |
| DE | 10105300 | 8/2002 |
| DE | 102004058698 | 2/2006 |
| FR | 1530587 | 6/1968 |

* cited by examiner

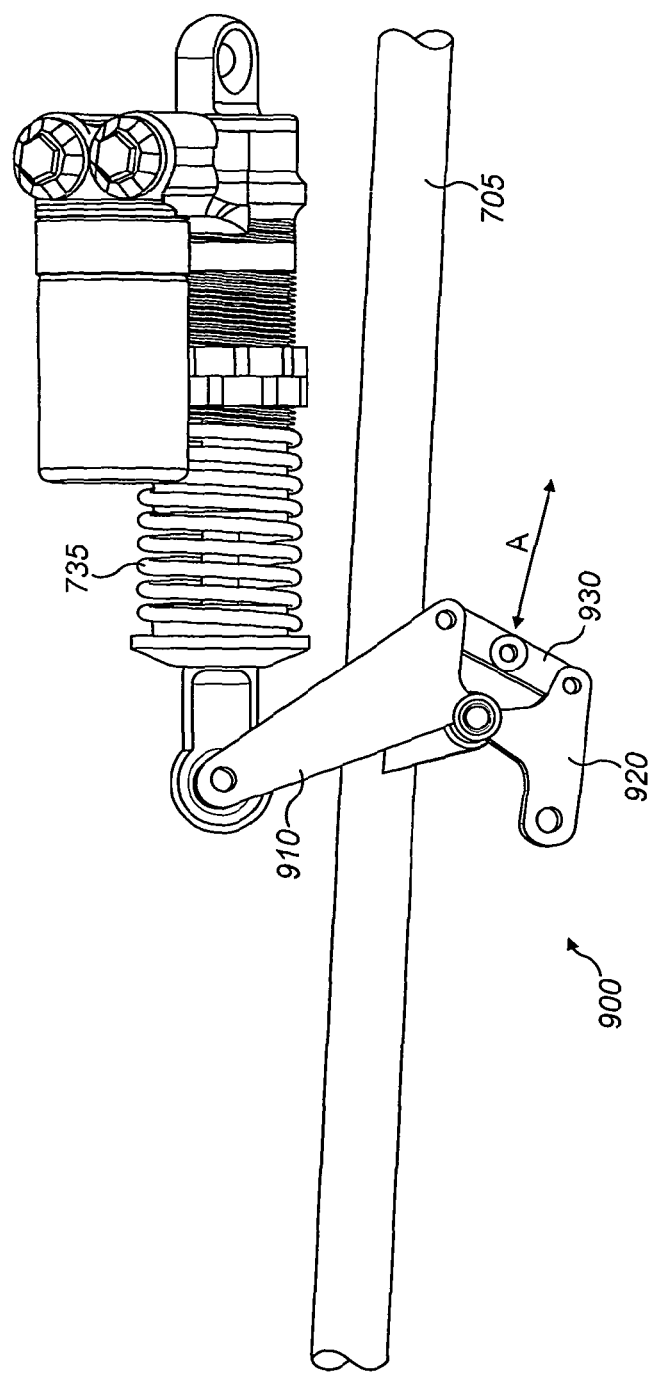

VARIABLE-GEOMETRY SUSPENSION APPARATUS AND VEHICLE COMPRISING SUCH APPARATUS

CROSS-REFERENCE TO RELATED APPLICATION

This application is the U.S. national phase of PCT Appln. No. PCT/GB2011/001121 filed on Jul. 26, 2011, which claims priority to British Patent Application No. GB 1014276.8 filed on Aug. 26, 2010, the disclosures of which are incorporated in their entirety by reference herein.

FIELD

This invention relates to variable-geometry suspension apparatus. It also relates to a vehicle, such as a car, motorbike or other vehicle, that comprises such apparatus.

BACKGROUND

Suspension apparatus is provided in existing vehicles to at least partly isolate a suspended mass of the vehicle from irregularities in the surface on which the vehicle is to travel. Such isolation provides a smoother ride than would otherwise be the case for passengers that form part of the suspended mass. Existing suspension apparatus also aims to resist undesirable changes in attitude of the suspended part of the vehicle that tend to occur during acceleration, braking and during changes in the direction of travel. Such changes in attitude, sometimes referred to as "body pitch" and "body roll", are undesirable in reducing the comfort of passengers and also in reducing the performance of the vehicle, which, at exaggerated attitudes, may become unresponsive or unsafe.

Suspension apparatus can generally be separated into two categories: passive suspension and active suspension. In passive suspension apparatus, characteristics of the apparatus cannot be varied during operation. By contrast, in active suspension apparatus, some characteristics can be varied, usually in an attempt to avoid more completely the undesirable phenomena identified above. For example, in some active suspension apparatus, additional energy can be supplied to the apparatus to adjust the ride height of the vehicle independently and dynamically at each point of suspension and thereby reduce body roll. In other active suspension apparatus, which are perhaps more properly termed "semi-active suspension", the viscosity of fluid in dampers of the apparatus can be varied dynamically to change the rate at which the suspension rebounds. The rebound rate can be varied in this way during operation to provide ride characteristics that adjust to account for changes in the operating conditions of the vehicle, for example, changes in the surface on which the vehicle is travelling, the speed of the vehicle or whether or not the vehicle is cornering. Though active and semi-active suspension has met with some success in improving the performance of suspension apparatus, such arrangements are generally complex and expensive, and can also be large and heavy. For example, the use of electro-hydraulic components to provide the suspension in active suspension apparatus results in high initial cost, significant energy consumption during use, high servicing cost and difficulty in packaging those components within the vehicle because of higher weight and larger size than their passive equivalents. Semi-active arrangements that use magnetorheological dampers have a lower energy consumption during use, but do not generally perform as well as fully active arrangements.

There is therefore a need to provide suspension apparatus that exhibits at least some of the advantages of active or semi-active suspension, but that avoids at least some of their drawbacks.

SUMMARY

In general terms, embodiments of the invention provide suspension apparatus in which the geometry of passive elements of the apparatus can be varied dynamically by an actuator. Thus, passive elements are still used to suspend the relevant mass, but the geometry of these elements can be varied dynamically to give performance approaching that of active suspension. As passive elements are still used, many of the complicated components associated with existing active suspension arrangements, and the associated disadvantages, are avoided.

According to a first aspect of this invention, there is provided variable-geometry suspension apparatus for a vehicle, the apparatus comprising a resiliently compressible member, an actuator arrangement and support structure, wherein:
  the resiliently compressible member is mounted in the support structure for compression under the weight of a mass suspendable by the apparatus,
  and wherein:
  the compressible member is mounted with at least one end of the compressible member displaceable in a displacement direction having a component perpendicular to the direction of compression, so that such displacement varies the geometry of the suspension apparatus and thereby varies the compression of the compressible member; and
  the actuator arrangement is arranged for displacing the end of the compressible member in the displacement direction to vary the geometry and thereby vary the compression.

The actuator arrangement may be operable to displace the end of the compressible member in this way.

The actuator arrangement may be arranged for acting on the compressible member for increasing and decreasing displacement of the end of the compressible member in the displacement direction. The actuator arrangement may be arranged to exert, selectively, (that is, it may be operable to exert, selectively) each of a tensile and a compressive force on the end of the compressible member in the displacement direction, thereby selectively increasing and decreasing displacement in the displacement direction.

The compressible member may comprise a spring. The compressible member may comprise a damper (sometimes referred to as a "shock-absorber" in US English). The compressible member may comprise an inerter. The compressible member may be a passive network comprising one, more or all of these components. The compressible member may be a strut comprising a spring and/or damper and/or inerter. Where there is a spring and a damper, these may be provided in a coil-over-damper arrangement.

The compressible member may be mounted in the support structure, and the support structure may be arranged, such that movement in the displacement direction compresses or extends the compressible member. The compressible member may be mounted in the support structure, and the support structure may be arranged, such that movement in the displacement direction varies the distance between mounting points of the compressible member in the support structure, thereby compressing or extending the compressible member. The compressible member may be mounted in the support structure and the support structure may be arranged to function as passive suspension apparatus without operation of the actuator arrangement. The actuator may be for varying the position of the compressible member relative to the support structure. The actuator may be for varying the position of the one end of the compressible member relative to the support structure. The compressible member may be mounted in the support structure and the support structure may be arranged such that the weight of the mass suspended by the apparatus does not act through the actuator, or only part of it acts through the actuator. A respective member may be provided for varying the position of each end of the compressible member.

The support structure may comprise a plurality of pivotally coupled members. The support structure may comprise a four-bar linkage, a first bar of the linkage for coupling to a wheel of the vehicle and a second bar of the linkage for coupling to, or constituted by part of, the vehicle chassis. One end of the compressible member may be coupled to a bar of the four-bar linkage. The other end of the compressible member may be coupled to the chassis. Both ends of the compressible member may be coupled to a respective bar of the four-bar linkage. At least one end of the compressible member, which may be the at least one end on which the actuator acts, may be coupled to a bar of the four-bar linkage by the actuator arrangement such that the actuator arrangement is arranged to vary the position of that one end of the compressible member relative to (for example, along) the bar to which it is coupled. This may be done by coupling the one end of the compressible member to a first component of the actuator arrangement that is linearly displaceable relative to a second component of the actuator arrangement, that second component being coupled to, or forming, the bar to which that one end of the compressible member is coupled. The actuator arrangement may pivotally coupled the one end of the compressible member to the relevant bar.

The support structure may form at least part of a double-wishbone suspension arrangement. A first end the compressible member may be coupled to one wishbone. This may or may not be the at least one end referred to above. It may be pivotally coupled. A second end of the compressible member may be coupled to the second wishbone. A second end of the compressible member may be coupled to the chassis. The compressible member may be coupled to the second wishbone (or the chassis) by a third wishbone. The ends of the third wishbone may be pivotally coupled to the arms of the second wishbone (or the chassis). The second end of the compressible member may be pivotally coupled to the third wishbone between the ends thereof. The actuator may act on the end of the compressible member that is coupled to the second wishbone (or the chassis, as the case may be). One part of the actuator may be coupled to the end of the compressible member that is coupled to the second wishbone. Another part of the actuator may be coupled to the chassis.

The support structure may form at least part of a rear suspension arrangement for a motorcycle.

The actuator may comprise components that are substantially linearly displaceable relative to one another, the one end of the compressible member being coupled to one of those components, to displace the one end of the compressible member in the displacement direction. The components may be controllably displaceable in this way. The actuator may include The actuator may comprise components that are pivotable relative to one another about a first pivot under the action of the actuator, the one end of the compressible member being pivotally coupled to at least one of the pivotable components, at a second pivot spaced from the first, such The actuator comprise an electrical actuator. It may comprise an electric motor. The actuator may comprise means to convert rotary motion into linear motion. One part of the actuator may be coupled to be driven by an electric motor. Another part of the actuator may be coupled to displace the one end of the compressible member. The actuator may comprise a ball screw arrangement to which the output shaft of the motor is coupled. The actuator may comprise a worm gear arrangement to which the output shaft of the motor is coupled. The actuator may comprise a rack and pinion arrangement, the pinion being driven by the motor, optionally via a worm gear. The output shaft of the motor may be coupled by intermediate drive means.

The actuator and at least part of the support structure may be arranged for fitting to existing suspension apparatus in substitution for part thereof. In other words, they may be "retrofitted".

The one end of the compressible member may be pivotally coupled to one end of a con-rod, the con-rod being pivotal about its other end under action of the actuator to displace the one end in the displacement direction. In an embodiment, the other end of the con-rob may be pivotally mounted to the chassis or to structure fixed thereto. In another embodiment, the other end of the con-rod may be pivotally mounted to a rocker that is pivotally mounted to the chassis or to structure fixed thereto, with the rocker coupled by a strut to, for example to a wheel hub or a wishbone coupled thereto, such that suspension movement of the wheel hub is transmitted via the strut to the rocker, and from the rocker to the con-rod and hence the compressible member. The con-rod and the strut may be mounted to either side of the pivotal mounting of the rocker. A series of meshing gears may be provided to transmit torque from the actuator to the con-rod. The meshing gears may be According to a second aspect of this invention, there is provided a vehicle comprising suspension apparatus according to the first aspect.

The vehicle of the second aspect may be a car; it may be a motorcycle; it may be another form of vehicle.

According to a third aspect of this invention, there is provided a method of operating apparatus defined hereinabove.

The method may comprise the steps of:
a) receiving at least one signal indicative of one or more of the wheel bounce and yaw, pitch, roll and bounce of a vehicle to which the apparatus is fitted; and
b) applying a transfer function to the at least one signal to generate a measure of the desired displacement of the at least one end of the resiliently compressible member.

The transfer function may comprise:
  i) a displacement saturation function to limit the displacement between limits; and/or
  ii) a velocity saturation function to limit the rate of change of displacement between limits.

BRIEF DESCRIPTION OF THE DRAWINGS

Specific embodiments of the invention will be described below by way of example only and with reference to the accompanying drawings, in which:

FIG. 23 is an alternative version of the sixth embodiment;

SPECIFIC DESCRIPTION OF CERTAIN EXAMPLE EMBODIMENTS

Figure 1:
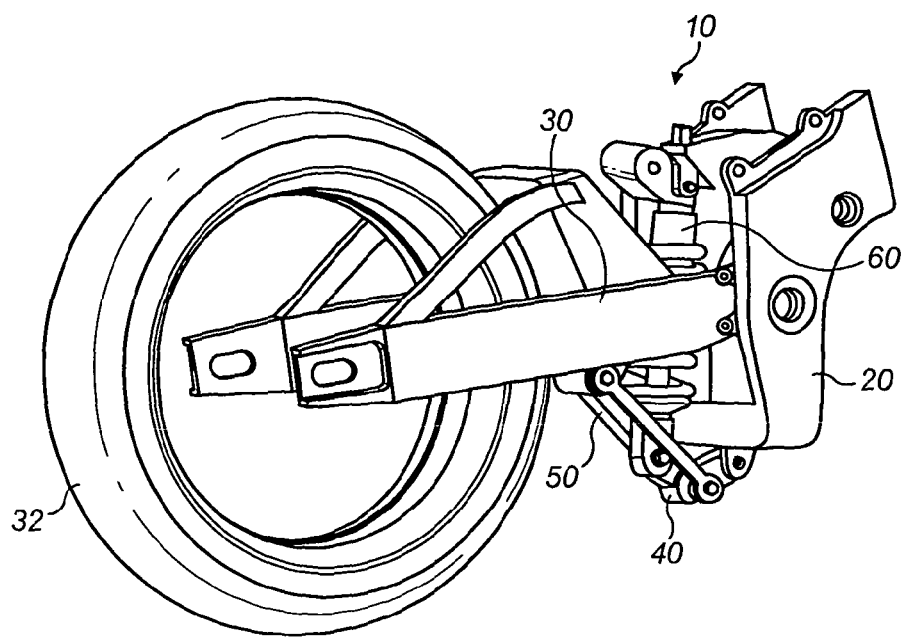
FIG. 1 shows existing rear suspension apparatus from a motorcycle.

FIG. 1 shows existing rear suspension apparatus 10 from a 2006 Suzuki GSX-R1000 motorcycle. The apparatus is in the form of a four-bar linkage. A first bar of the linkage is formed by the rear portion of the chassis 20 of the motorcycle. A second bar of the linkage is formed by a trailing arm 30, one end of which is pivotally mounted to the chassis 20 and the other end of which has the rear wheel 32 mounted to it. A third bar of the linkage is formed by a cushion lever 40, one end of which is pivotally mounted to the chassis 20, at a position below and spaced from the mounting position of the trailing arm 30. The fourth bar of the linkage is formed by a pair of bars 50, each of which is pivotally mounted at one end to the cushion lever 40 at a point approximately mid-way along the cushion lever 40. The pair of bars are mounted co-axially to the cushion lever 40, with one of the pair 50 on each side of the cushion lever 40 so as to sandwich it therebetween. The other end of each of the pair of bars 50 is pivotally mounted to the trailing arm 30. Again, these ends are mounted co-axially. Thus, a four-bar linkage is formed that allows the rear wheel 32 to move generally upwards and downwards along part of an arc about the point at which the trailing arm 30 is pivotally mounted to the chassis 20.

To complete the existing suspension arrangement 10, a coil-over-damper suspension strut 60 is provided. The suspension strut 60 is pivotally mounted at one end to the free end of the cushion lever 40 (that is, the end of the cushion lever 40 that is not mounted to the chassis 40) and pivotally mounted at the other end to the chassis 20. It will be understood that the spring of the suspension strut 60 is resiliently compressible to act downwardly on the trailing arm 30 and hence the rear wheel 32, and that the damper damps movement of the trailing arm. This existing arrangement is an example of a passive suspension system.

Figure 2:
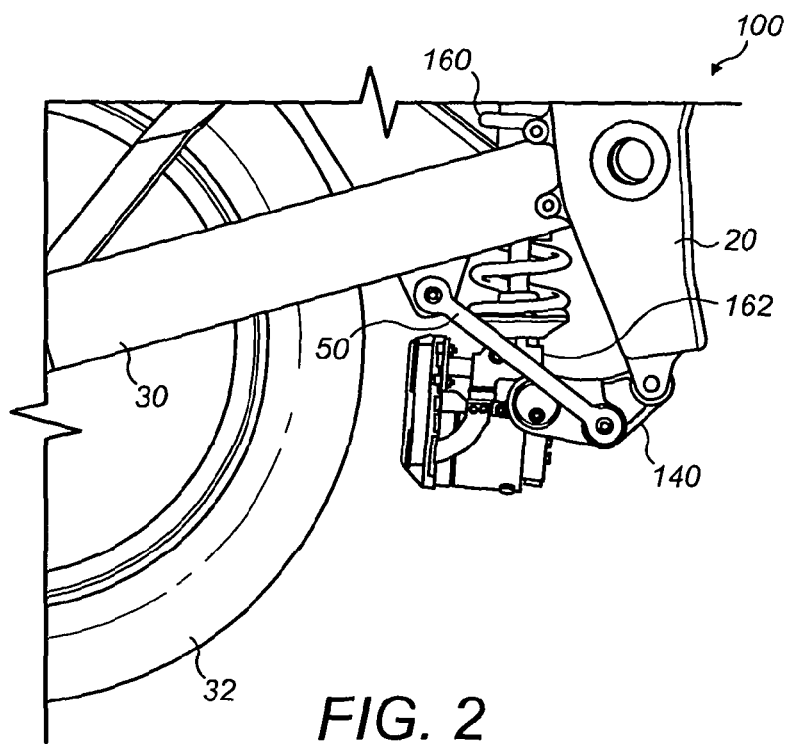
FIG. 2 shows suspension apparatus of a first embodiment.
Figure 3:
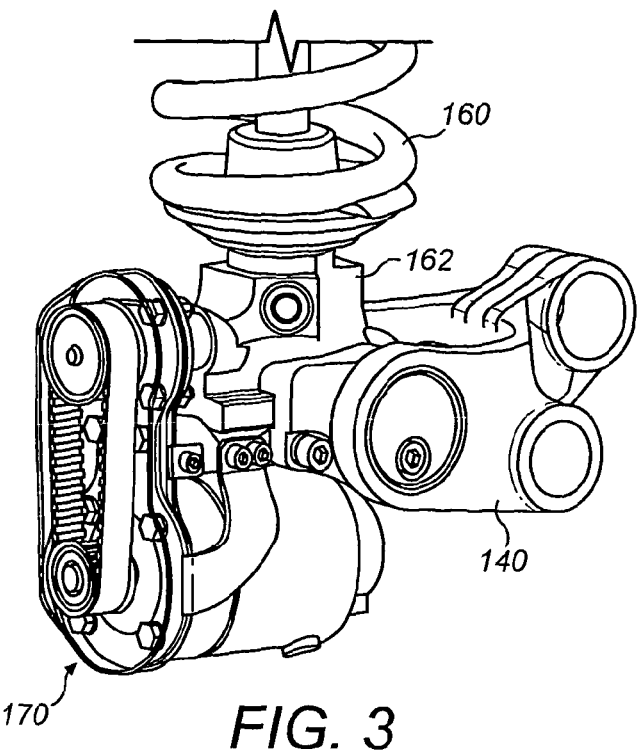
FIG. 3 shows certain components of the first embodiment in detail, including part of a suspension strut, a cushion lever, a rocking plate and an actuator.

FIG. 2 shows a first form of modified suspension apparatus 100 that is a first of many possible embodiments of the invention. The modified apparatus 100 is similar to the existing apparatus 10 in that it is also a four-bar linkage arrangement for a Suzuki GSX-R1000 motorcycle. However, certain components of the existing arrangement have been modified and some new components have been added in order to give a modified arrangement in which the geometry of this suspension apparatus 100 can be varied. This is explained in detail below.

With continued reference to FIG. 2, the modified suspension apparatus 100 has the same chassis 20, trailing arm 30 and pair of bars 50 as in the existing suspension apparatus 10 described above with reference to FIG. 1. The modified suspension apparatus 100 includes a modified cushion lever 140 that differs from that 40 described above, a slightly modified suspension strut 160 and new components in the form of an actuator 170 and a rocking pad 180. Each of these will be described in turn.

The modified cushion lever 140 is similar to the cushion lever 40 of FIG. 1 in that one end is pivotally mounted to the chassis 20 as before and the pair of bars 50 are pivotally mounted to the cushion lever 140 as before. The other end of the cushion lever 140 is modified to receive the rocking pad 180 pivotally mounted therein for rotation about an axis transverse the length of the motorcycle.

Figure 4:
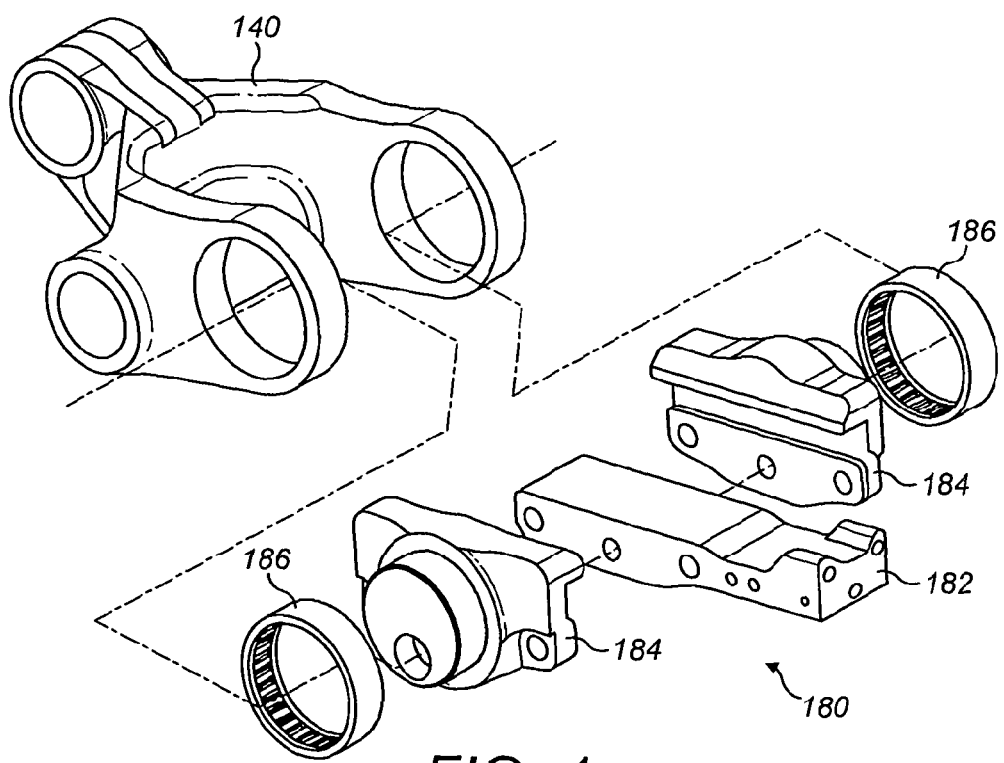
FIG. 4 is an exploded view of the cushion lever and the rocking plate.

With reference to FIG. 4, the rocking pad 180 includes a base plate 182 and two side plates 184. The side plates are bolted along either side of the base plate 180 to sandwich the base plate 182 therebetween and such that a ridge on each side plate 184 projects towards the respective other ridge, forming a recessed channel therebelow. Each side plate 184 includes a respective projecting spigot that is journalled, by way of bearings 186, in the cushion lever 140.

Figure 5:
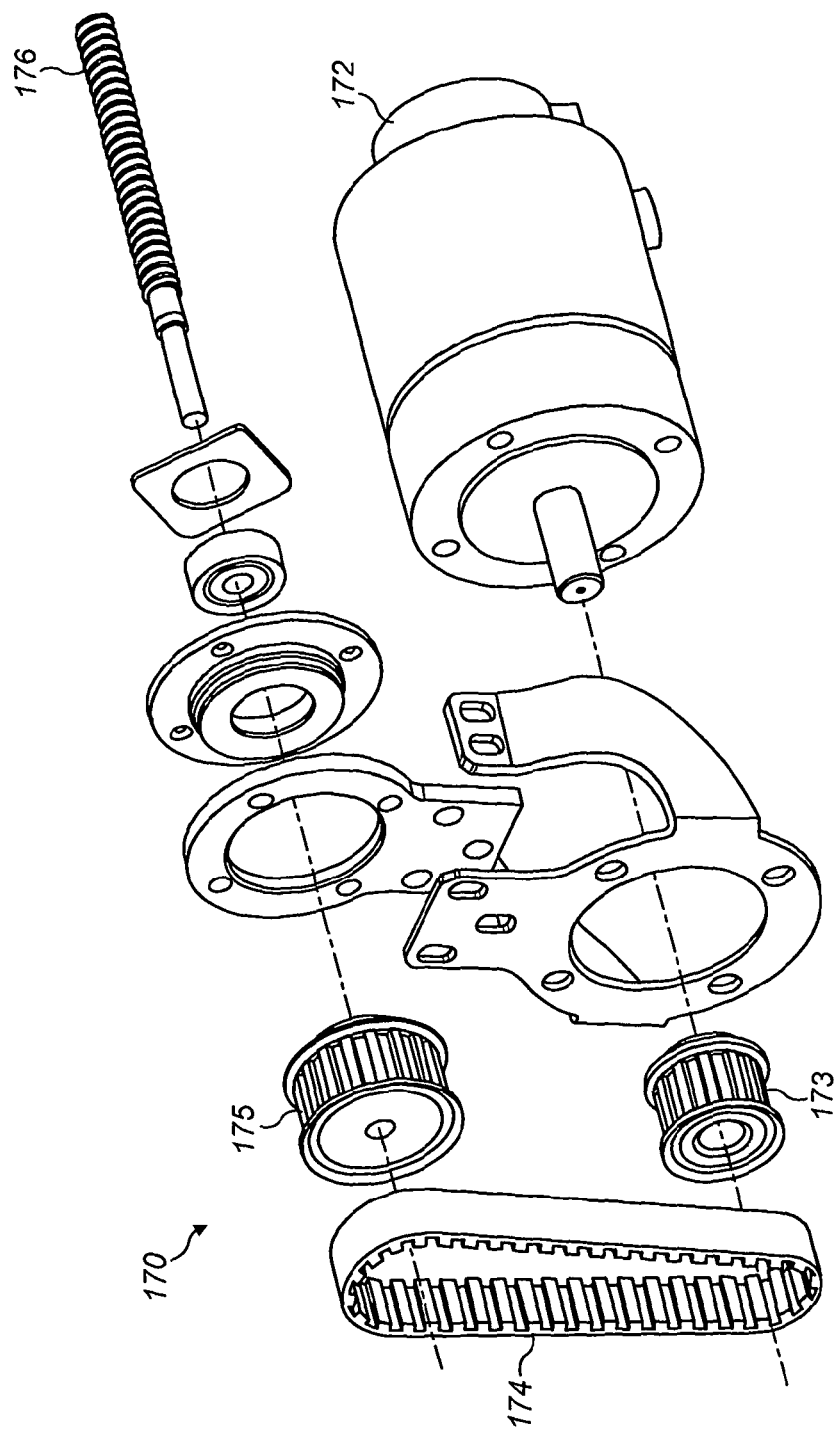
FIG. 5 is an exploded view of the actuator.

With reference to FIG. 5, the actuator 170 includes a small DC brushless torque motor 172. The motor 172 is bolted to the rocking pad 180 to be supported thereby. A first toothed pulley 173 is mounted on the shaft of the motor 172 and connected by a toothed belt 174 to a second toothed pulley 175 that is mounted on threaded shaft 176 that forms the screw of a ball-screw arrangement. The threaded shaft 176 and the motor 170 are arranged with their axes parallel, spaced apart and in the direction along the length of the motorcycle.

Figure 6:
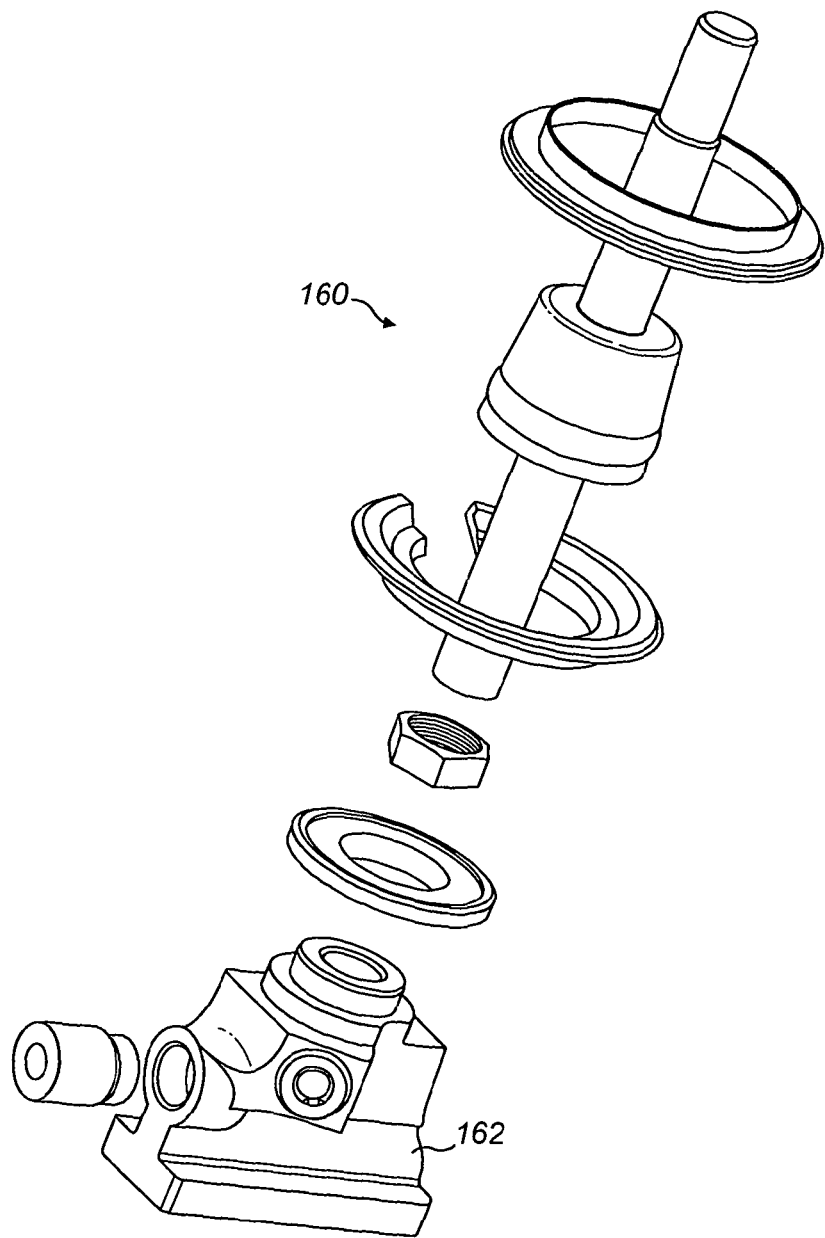
FIG. 6 is an exploded view of the suspension strut, showing a shoe thereof.

With reference to FIG. 6, the modified suspension strut 160 of the present apparatus 100 is generally the same as the strut 60 described above with reference to FIG. 1, but differs in that the modified strut 160 has a shoe 162 fitted to the end of the strut 160 that is for coupling to the cushion lever 140. The shoe 162 contains a ball assembly (not shown) that cooperates with the threaded shaft 176 to form the ball-screw arrangement referred to above. The shoe 162 also includes a projection along each side thereof that, together, are a sliding fit in the recessed channel of the rocking pad 180.

In alternative embodiments, arrangements may be provided to reduce friction between the shoe and the rocking pad when the shoe moves along the channel in the latter. For example, the shoe may also include a "roller skate" arrangement at the lower end so that it rolls like a roller skate along a surface of the rocking pad 180, rather than sliding. This would be to reduce friction. It is envisaged that such an arrangement would include cylindrical rollers almost as wide as the shoe 162 which are pivotally mounted to transverse axles, which in turn are attached to the lower end of the shoe 162 with enough clearance so that the upper ends or the rollers do not touch the shoe.

Returning to the embodiment described with reference to FIGS. 2 to 6, thus, the rocking pad 180 is pivotally mounted in the modified cushion lever 140. The actuator 170 is fixedly mounted to the rocking pad. The shoe 162, and hence the end of the suspension strut 160 that is not attached to the chassis 20, is slidably mounted in the rocking pad 180, so as to be moveable forwards and backwards in a direction along the length of the motorcycle under the action of the ball screw as powered by the motor 172 of the actuator 170. In the present arrangement, operating the actuator to move the shoe 162 forwards increases or decreases (depending on the starting position of the shoe 162 relative to the rocking pad 180) the length of the suspension strut 160 and so decompresses or compresses the spring thereof, decreasing or increasing the force exerted by the spring on the remainder of the suspension apparatus 160. Similarly, operating the actuator 170 to move the shoe 162 backwards increases or decreases the length of the suspension strut 160 (again, depending on the starting position) and so also varies the force exerted by the spring on the remainder of the suspension apparatus 160. For example, if the starting position of the shoe 162 is at the point of minimum compression of the suspension strut 160, moving the shoe in either direction will increase compression. However, if the starting position of the shoe 162 is to one side of the point of minimum compression, moving the shoe 162 in one direction will increase compression and moving the shoe 162 in the other direction will reduce compression.

In operation, it is envisaged that the actuator 170 be operated by a suitable control system, in accordance with a suitable control method, to provide improved suspension performance and hence improved ride, handling and stability of the motorcycle. A suitable control system and method is described below with reference to FIGS. 15 to 17. For example, it is envisaged that the actuator 170 be controlled dynamically to reduce a phenomenon experienced particularly in sports motorcycles and other high-performance motorcycles in which suspension oscillations can interact with movements due to steering to cause the motorcycle to weave, sometime uncontrollable. This phenomenon is known as "cornering weave". It is also envisaged that the actuator 170 be controlled to vary the ride height.

It will be understood than the modified suspension apparatus 100 described above allows the geometry of passive components similar to those used in existing arrangements to be varied. Varying the geometry in this way allows some active control of the suspension apparatus, but without the complicated and expensive components usually required for active or semi-active suspension. Instead, straightforward passive components can be used. Furthermore, the geometry can be varied with low actuation forces and hence low power requirements and energy consumption. It should also be noted that, should the actuator 170 in the modified suspension apparatus 100 fail and cease to operate, the passive components will continue to work. This is a further distinction with an active suspension arrangement in which component failure usually results in complete failure of the suspension.

Figure 7:
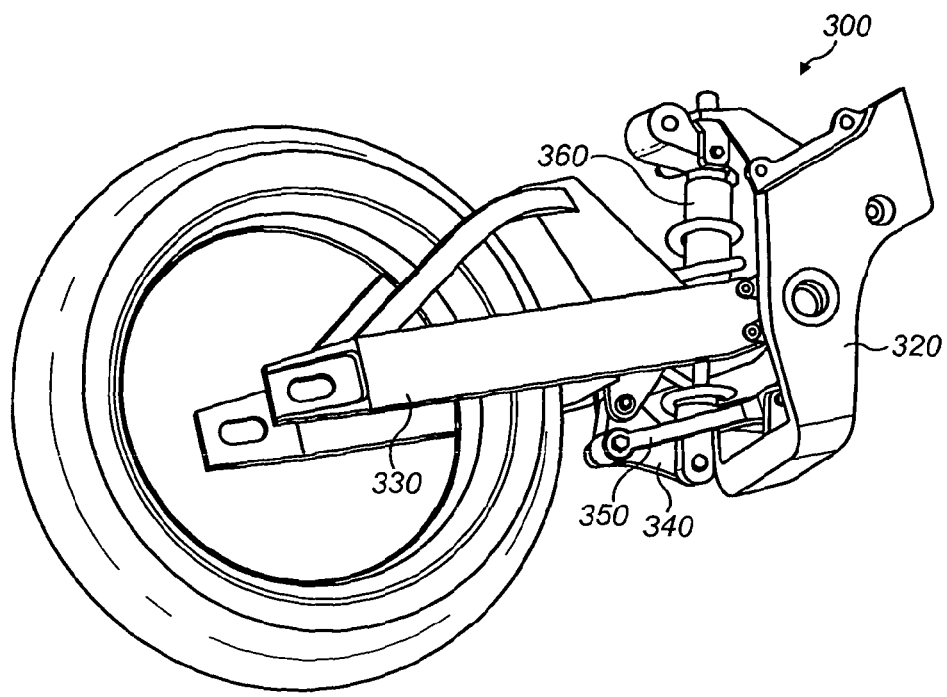
FIG. 7 shows existing rear suspension from another motorcycle.

FIG. 7 shows existing rear suspension apparatus 300 from a 2007 Suzuki GSX-R1000 motorcycle. The suspension apparatus of the 2007 model is very similar to that of the 2006 model descried above with reference to FIG. 1, but differs in that (with continued reference to FIG. 7) the cushion lever 340 is not connected between the chassis 320 and the pair of bars 350. Instead, the cushion lever 340 is connected between the trailing arm 330 and the pair of bars 350. The other end of the pair of bars 350 is connected to the chassis 320. In other words, the cushion lever 340 is mounted in place of the pair of bars 350; and the pair of bars 350 is mounted in place of the cushion lever 340. The mounting point of the trailing arm 330 and of the pair of bars 350 on the cushion lever 340 are to one end of the cushion lever 340, with the trailing arm mounting point above that for the pair of bars 350. The cushion lever 340 projects forwards such that its other end thereof is forwards of the two mounting points just described. One end of the suspension strut 360 is mounted to that forward end of the cushion lever 340, and the other end of the suspension strut 360 is mounted to the chassis 320. Thus, as in the 2006 arrangement, the suspension strut 360 is mounted to both the cushion lever 340 and the chassis 320.

A second form of modified suspension apparatus 400 that is similar to the first form described above with reference to FIGS. 2 to 6 will now be described with reference to FIGS. 8 to 10. This amounts to a second embodiment.

Figure 8:
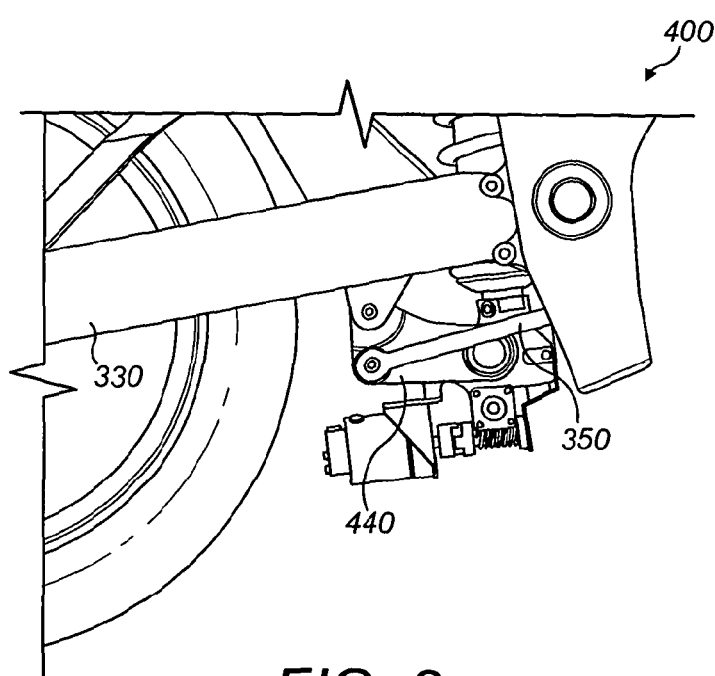
FIG. 8 shows suspension apparatus of a second embodiment.

With continued reference to FIG. 8, as with the first embodiment, in this embodiment a modified cushion lever 440 is provided. The modified cushion lever 440 of this embodiment is mounted to the trailing arm 330 and the pair of bars 350 as is the case with the standard cushion lever 340 of this 2007 model. However, as in the first embodiment, the modified cushion lever 440 of this embodiment is arranged to receive a rocking pad 480 pivotally mounted therein. The modified cushion lever 440 of this embodiment is arranged to receive the rocking pad 480 in the forward end thereof.

The arrangement of the rocking pad 480 is similar to that of the first embodiment in that it is arranged to receive a shoe 462 that is coupled to the end of the suspension strut 460 that is not connected to the chassis 320. The rocking pad 480 receives the shoe 462 such that it is retained therein in a direction substantially parallel the direction of action of the suspension strut 460, but such that the shoe 462 and hence the end of the suspension strut 460 connected thereto can slide forwards and backwards relative to the rocking pad 480. More detail is shown in FIG. 9 and FIG. 10.

Figure 9:
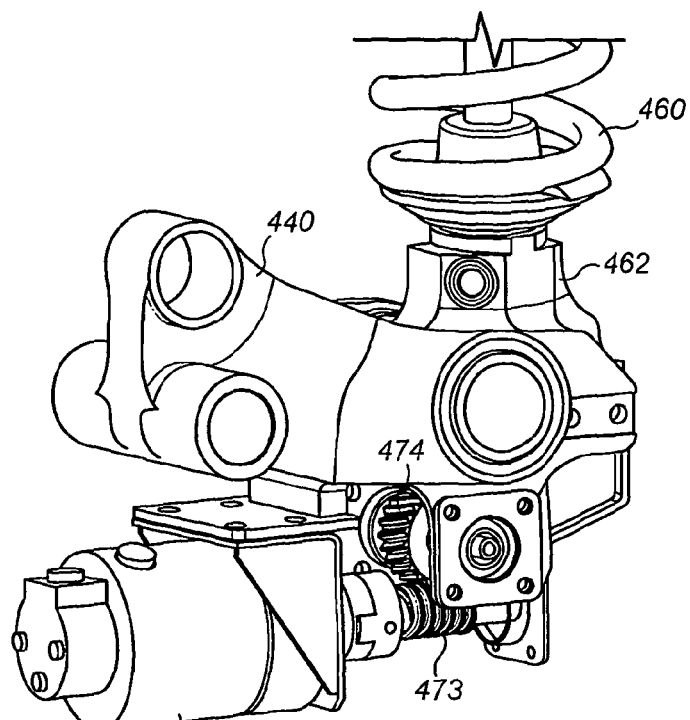
FIG. 9 shows certain components of the second embodiment in detail, including a cushion lever, a rocking plate an actuator and a suspension strut.
Figure 10:
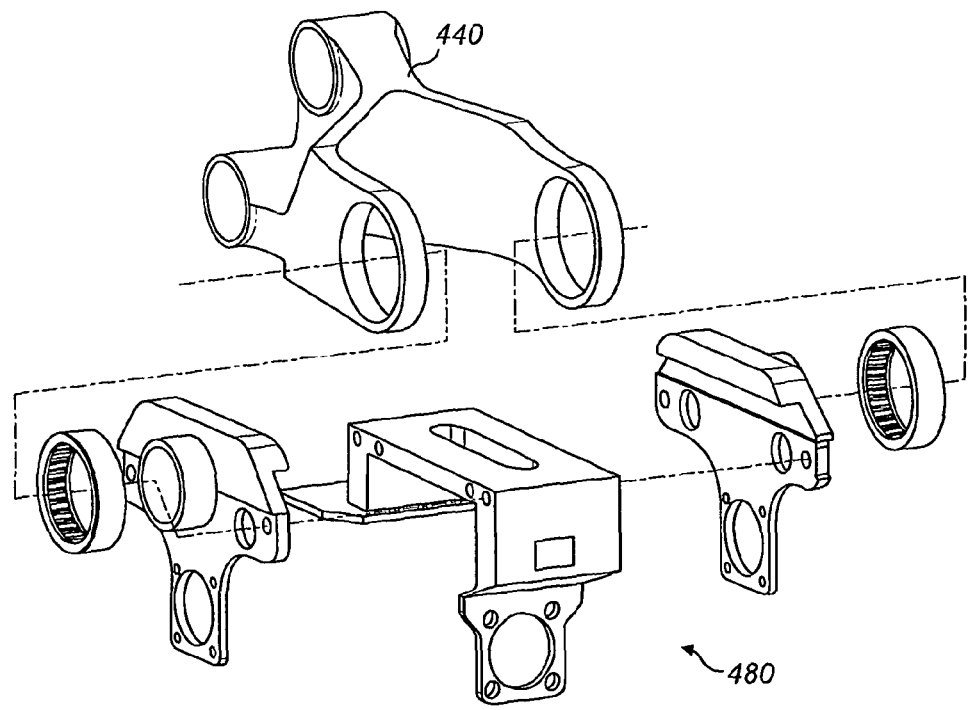
FIG. 10 is an exploded view of the cushion lever and the rocking plate of the second embodiment.
Figure 11:
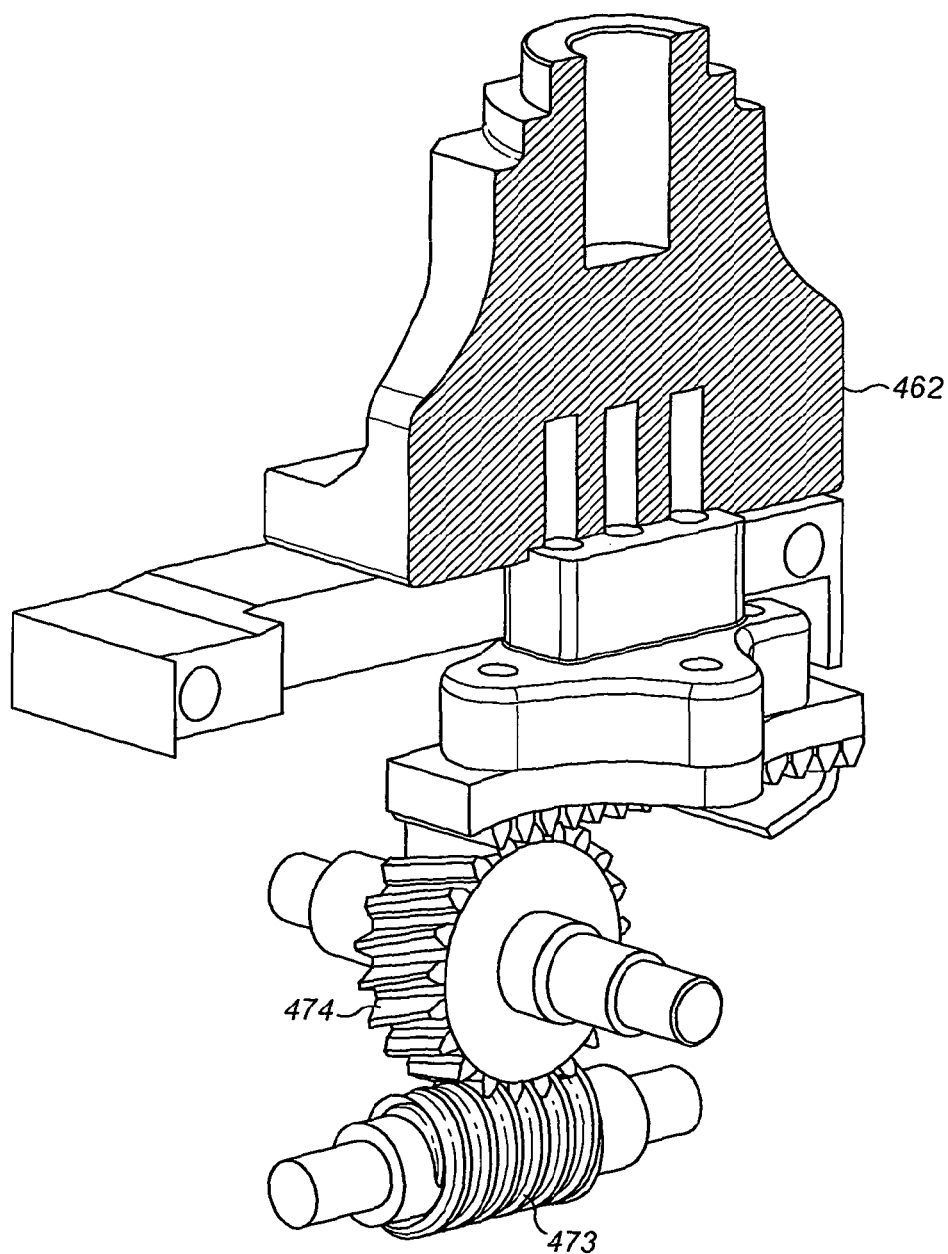
FIG. 11 is a fragmentary view of a drive arrangement by which the actuator of the second arrangement can displace an end of the suspension strut.

With reference to FIG. 9, the present embodiment also includes an actuator having a small DC brushless torque motor 472. The motor 472 is bolted to the rocking pad 480 to be supported thereby. A worm gear 473 is mounted to the output shaft of the motor 472 and meshes with a pinion gear 474 that is also mounted to the rocking pad 480. The pinion gear 474 in turn meshes with a rack gear 463 that is fixed to the shoe 462 of the suspension strut 460.

Operation of the present embodiment is similar to that of the first embodiment: the motor 472 can be operated to move the shoe 462, and hence the end of the suspension strut 460 to which it is connected, forwards and backwards relative to the rocking plate 480, and thereby decompress or compress the suspension strut 460, depending on the direction of movement and on the starting position of that movement.

Figure 12:
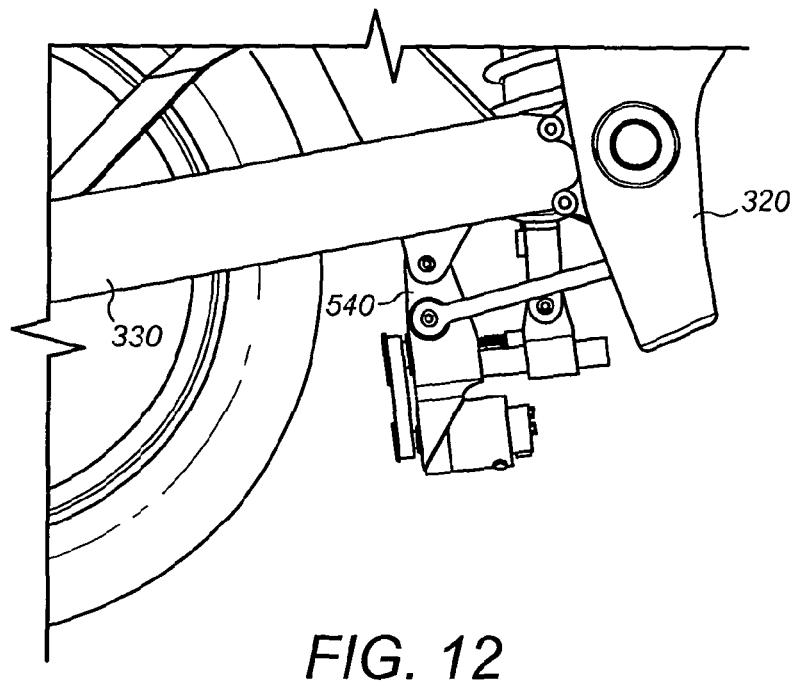
FIG. 12 shows suspension apparatus of a third embodiment.
Figure 13:
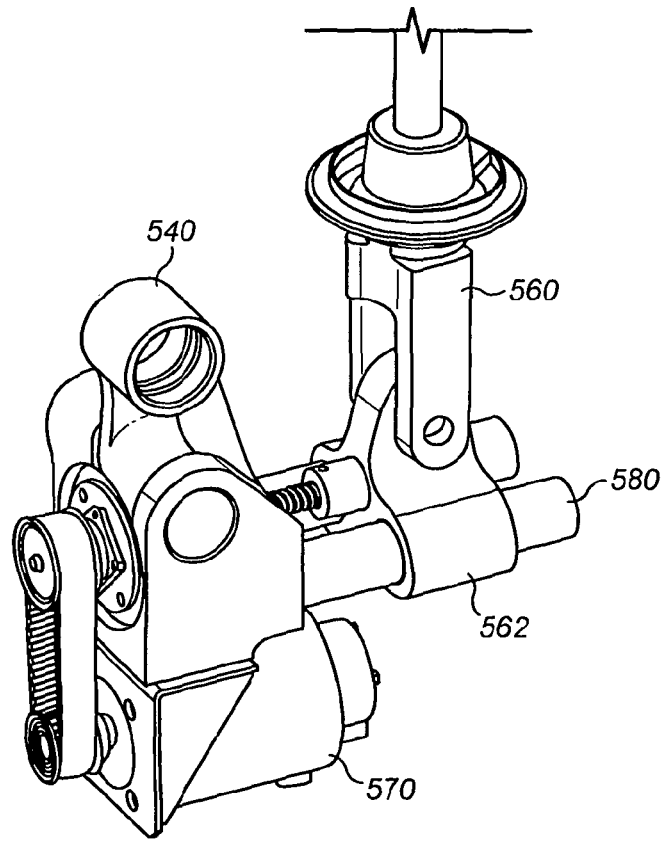
FIG. 13 shows certain components of the third embodiment in detail.

A third embodiment is shown in FIGS. 12 and 13 that is also for use on the 2007 Suzuki GSX-R1000. In this embodiment, a further modified cushion lever 540 is used. This cushion lever 540 is mounted as before to the trailing arm 330 and the pair of bars 350. However, the cushion lever 540 is modified to have a pair of parallel shafts 580 that project from the cushion lever 540 in a forward direction, and arranged side-by-side. The suspension strut 560 has a carriage 562 pivotally coupled to the end thereof that is not fixed to the chassis 320. The carriage 562 has a pair of apertures therethrough arranged such that the carriage is a sliding fit on the pair of shafts 580.

A motor 570 is mounted to the cushion lever 540 and connected to move the carriage 562 relative thereto by a ball-screw arrangement, the screw being mounted in the cushion lever 540 for rotation and the ball being in the carriage 562. Operation is as before.

Figure 14:
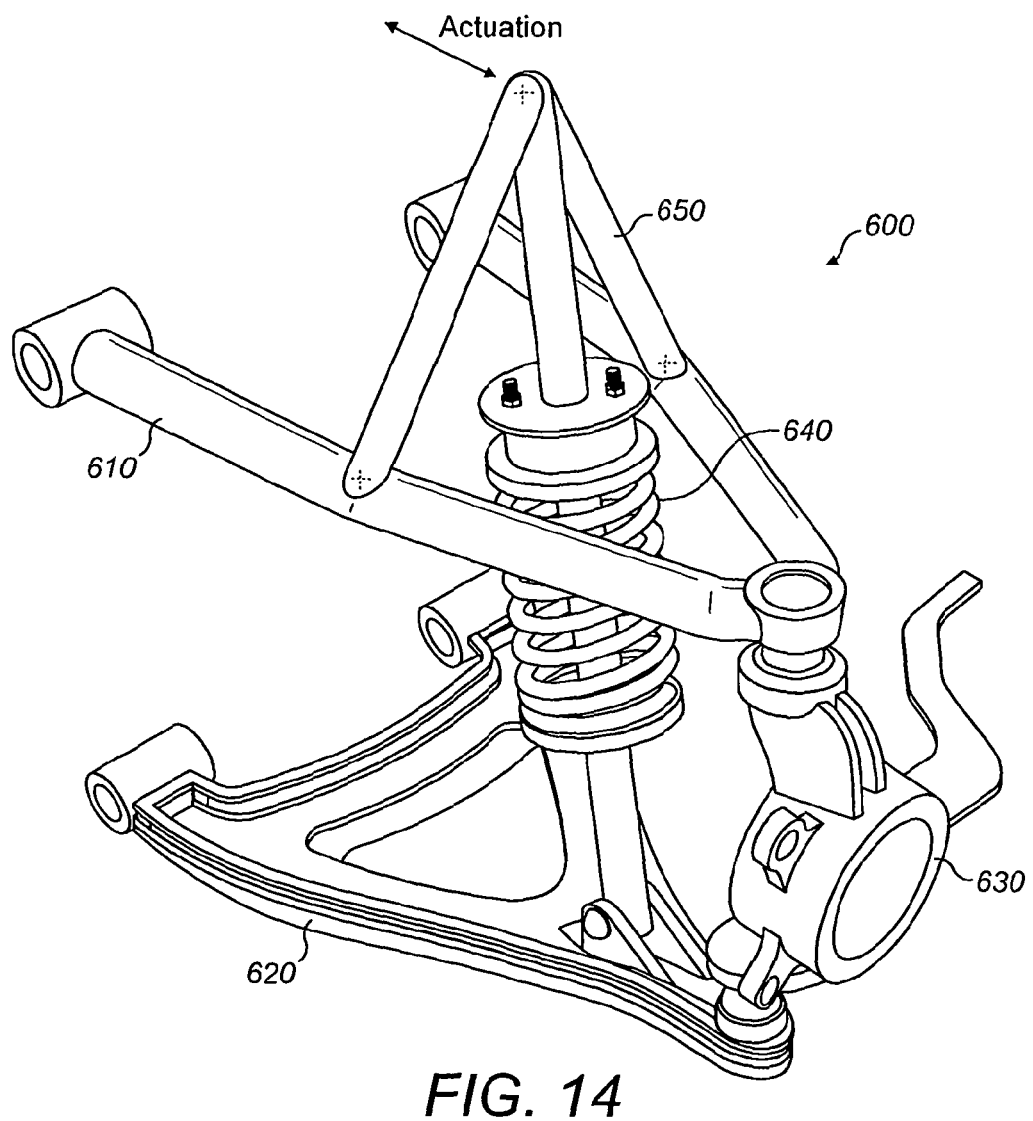
FIG. 14 shows suspension apparatus of a fourth embodiment.

A fourth embodiment of a modified suspension arrangement is shown in FIG. 14. In this embodiment, a variable geometry suspension arrangement 600 for a car is provided. The suspension arrangement of the car is of the double-wishbone type in which an upper 610 and lower 620 wishbone are each pivotally connected at their ends to the car chassis (not shown), and in their middles to a hub 630 for supporting a wheel (not shown). As is conventional, a lower end of a coil-over-damper suspension strut 640 is pivotally connected to the lower wishbone 620 at a position spaced from the chassis.

However, the present arrangement 600 differs from a conventional arrangement in that the upper end of the suspension strut 640 is moveably mounted. In the present embodiment, the upper end of the suspension strut 640 is pivotally connected to the middle of a third wishbone 650, the ends of which are pivotally connected midway along each side of the upper wishbone 610. An actuator (which is represented only schematically in FIG. 14) is mounted between the chassis and the upper end of the suspension strut 640 to displace that end of the strut 640 generally towards and away from the chassis, such that the strut 640 is decompressed or compressed, depending on the direction of displacement and the starting position from which the strut 640 is displaced. It is envisaged that the actuation arrangement make use of an electric motor and an associated drive mechanism in a manner similar to those described in first, second and third embodiments above.

A control system suitable for controlling the actuator in the embodiments described hereinabove will now be described. Although the general principals described below are applicable to all of the embodiments described hereinabove, the specific control system described below is for use in controlling the motorcycle embodiments of FIGS. 1 to 13.

Figure 15:
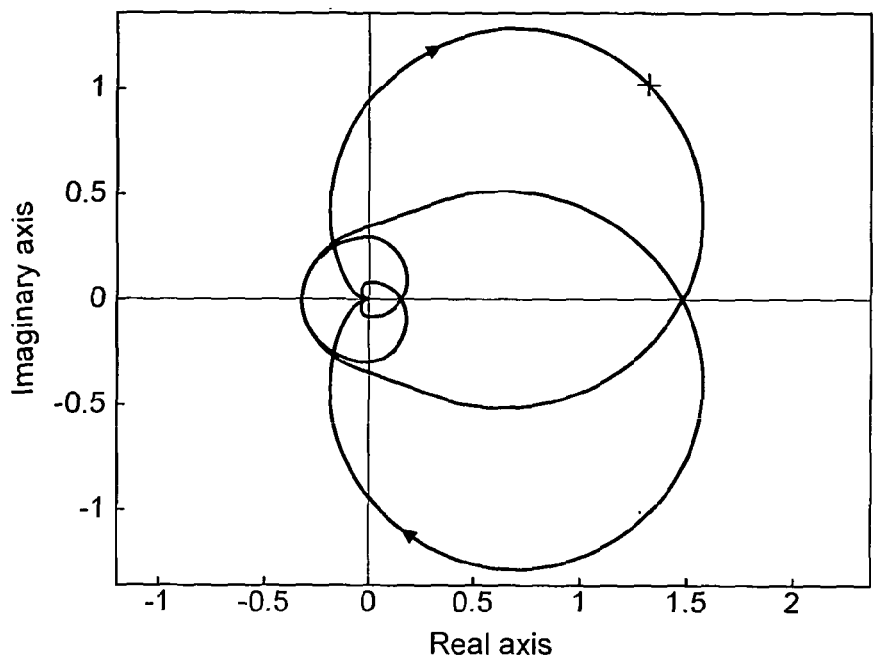
FIG. 15 shows a Nyquist diagram of an open-loop linearised motorcycle model relating to a control system that forms a further embodiment.

In the present embodiment of the control system, the actuator is considered to be a single-input single-output displacement controller that reacts to the yaw rate of the motorcycle. Yaw rate is chosen as the feedback control signal because it is measurable in practice and because the yaw freedom participates systematically in weave oscillations of the motorcycle. In order to design the feedback controller to reduce this weave, reference is made to the Nyquist diagram of an open-loop linearised motorcycle model providing the signal transmission path from actuator displacement to yaw rate. This is shown in FIG. 15. More specifically, FIG. 15 shows the Nyquist diagram for an open-loop motorcycle transfer function from variable geometry actuator displacement, $d_a$, to yaw rate, $\dot{\psi}$. The motorcycle forward speed is 75 m/s and the roll angle is 15 deg. The frequency of 27.5 rad/s, corresponding to weave, is shown with a +.

With continued reference to FIG. 15, this diagram should be interpreted according to a positive feedback convention in which the important real axis point is +1 rather than −1. The frequency response for a mild-cornering, high-forward-speed condition is considered; at this operating condition, weave is likely to respond vigorously to road forcing, leading to instability of the motorcycle. The weave mode frequency is 27.5 rad/s and the wobble mode frequency is 47.9 rad/s. The Nyquist diagram in FIG. 15 shows that, in order to improve the stability of the weave mode, one needs to phase compensate the weave mode frequency (shown with a +) by approximately +130°. It is also beneficial to reduce the gain of the frequency response at the wobble mode frequency to reduce the controller bandwidth and economise on the actuator power. A further requirement is for the very low frequency gain of the controller to approach zero so that the actuator restores its default (offset) position when constant yaw rate cornering equilibrium conditions are reached. A second-order compensator scheme which achieves these objectives is $d_a = K(s) s\psi$, where s is the Laplace variable, $s\psi$ is the yaw rate and $$K(s) = \frac{k_c s}{s^2 + 2\zeta\omega s + \omega^2}. \qquad \text{(Equation 1)}$$

Figure 16:
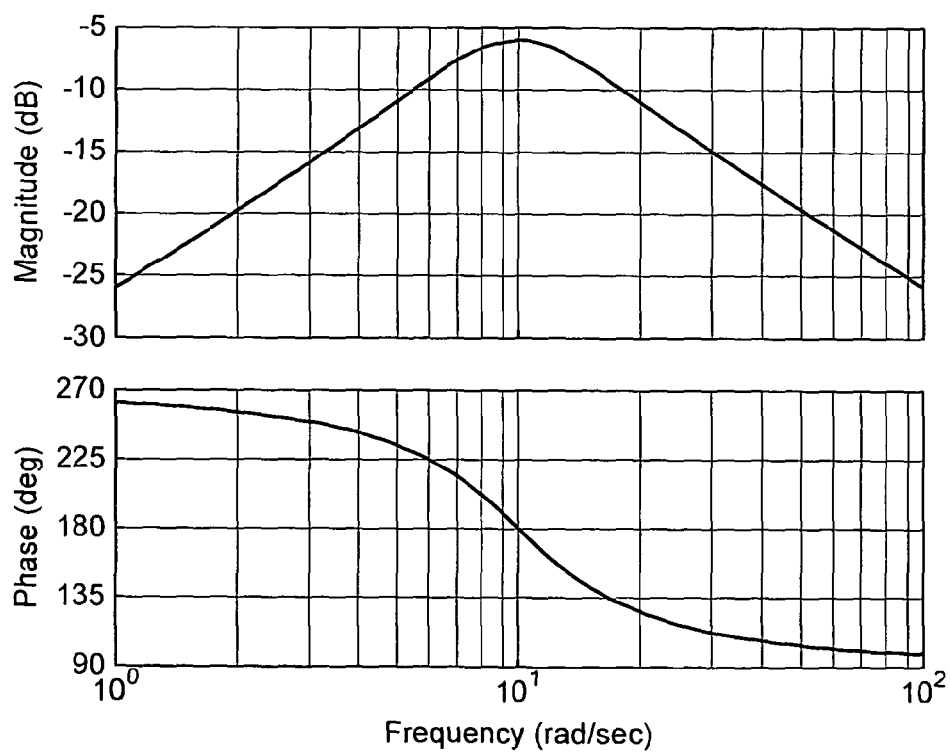
FIG. 16 shows the frequency response of a compensator of the control system.

The following parameter values were found to be suitable: $k_c = -5$, $\zeta = 0.5$, $\omega = 10$ The frequency response of the compensator is illustrated in FIG. 16 which shows the frequency response, K(s), in which yaw rate is the input and actuator displacement is the output.

Figure 17:
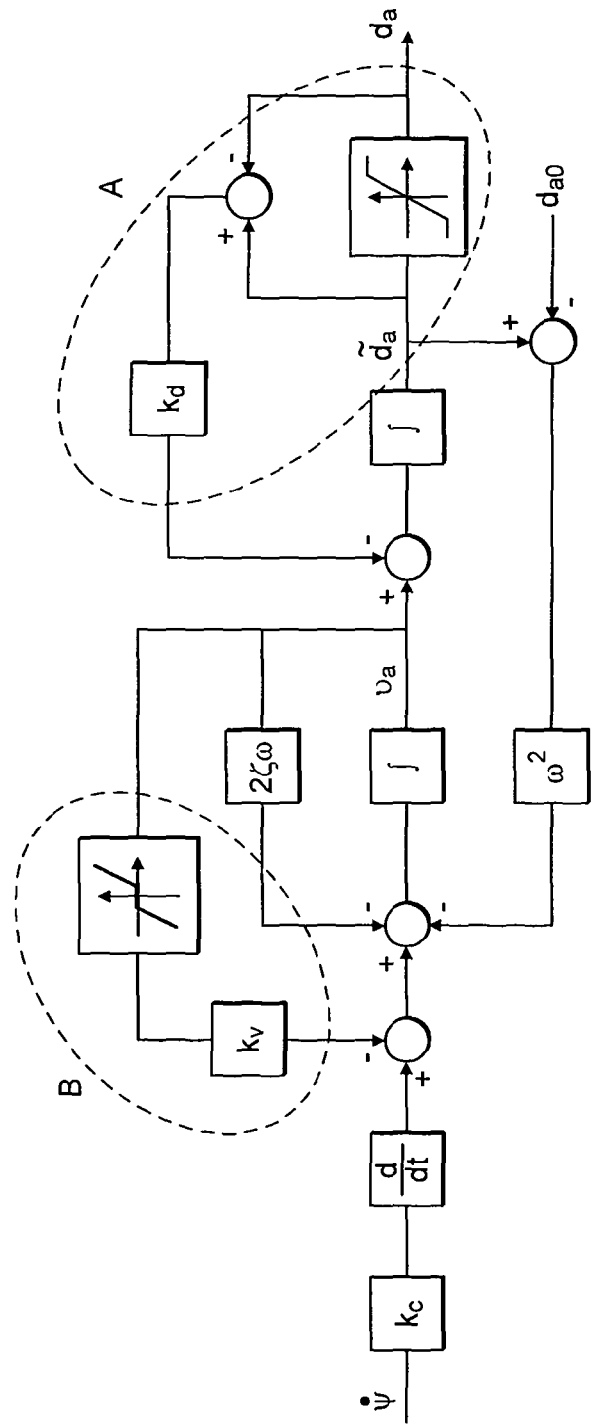
FIG. 17 is a schematic diagram of a scheme used in the control system.

The resulting controller is linear and would operate on the assumption that displacements of any size are achievable by the actuator. In practice this is not true and only a very limited displacement space is available. Based on simple examination of the standard suspension, it is reasonable to assume that displacements of up to ±25 mm away from a centre position are possible. In order to limit the response of the linear compensator in Equation 1 inside these boundaries, the controller is augmented with an integrator anti-windup scheme, as illustrated in FIG. 17. The yaw rate, $\dot{\psi}$, is the input and the saturated variable geometry displacement, $d_a$, is the output. The scheme utilises two smooth saturation functions, shown in FIG. 17 with larger blocks inside the areas labelled A and B, so that upper and lower bounds on the values of the actuator displacement and actuator velocity ($v_a$) are not exceeded. The displacement saturation function A is of the form shown in Equation 2, with the velocity saturation function B having a similar form, specifically that shown in Equation 3. When the unconstrained displacement output, $\tilde{d}_a$, is between $d_{amin}$ and $d_{amax}$ the displacement output of the scheme, $d_a$, has the same value as $\tilde{d}_a$, otherwise the saturation function returns $d_{amin}$ or $d_{amax}$ depending on which limit has been reached. $s_c$ is a shaping constant that determines the sharpness of the transition between non-saturation and saturation. It was established by simulation trials that $s_c = 5000$, $k_d = 10000$ and $k_v = 3000$ are suitable. By using the displacement saturation function A, displacement of the actuator, and the components coupled thereto to move therewith, can be limited without the need for mechanical stops. This provides a mechanical arrangement that is simpler and lighter.

$$d_a = \begin{pmatrix} -\frac{1}{\pi}\arctan(s_c(\tilde{d}_a - d_{amax})) + \\ \frac{1}{\pi}\arctan(s_c(\tilde{d}_a - d_{amin})) \end{pmatrix} \tilde{d}_a + \quad \text{(Equation 2)}$$

$$\left(\frac{1}{\pi}\arctan(s_c(\tilde{d}_a - d_{amax})) + \frac{1}{2}\right)d_{amax} -$$

$$\left(\frac{1}{\pi}\arctan(s_c(\tilde{d}_a - d_{amin})) - \frac{1}{2}\right)d_{amin}$$

The actuator velocity is constrained in order to reduce the peak forces and power required by the actuator, and again, it was found by trial and error that it is beneficial to restrict its value within ±1.15 m/s without any performance loss. The parameter values for the scheme shown in FIG. 17 are $k_c$=−5, $\zeta$=0.5, $\omega$=10, $k_d$=10000, $k_v$=3000 and $d_{a0}$=0.015 m. The velocity saturation function is labelled at B in FIG. 17 and its output is $\hat{v}_a$ according to Equation 3.

$$\hat{v}_a = v_a - \begin{bmatrix} \begin{pmatrix} -\frac{1}{\pi}\arctan(s_c(v_a - v_{amax})) + \\ \frac{1}{\pi}\arctan(s_c(v_a - v_{amin})) \end{pmatrix} v_a + \\ \left(\frac{1}{\pi}\arctan(s_c(v_a - v_{amax})) + \frac{1}{2}\right)v_{amax} - \\ \left(\frac{1}{\pi}\arctan(s_c(v_a - v_{amin})) - \frac{1}{2}\right)v_{amin} \end{bmatrix} \quad \text{(Equation 3)}$$

Figure 18:
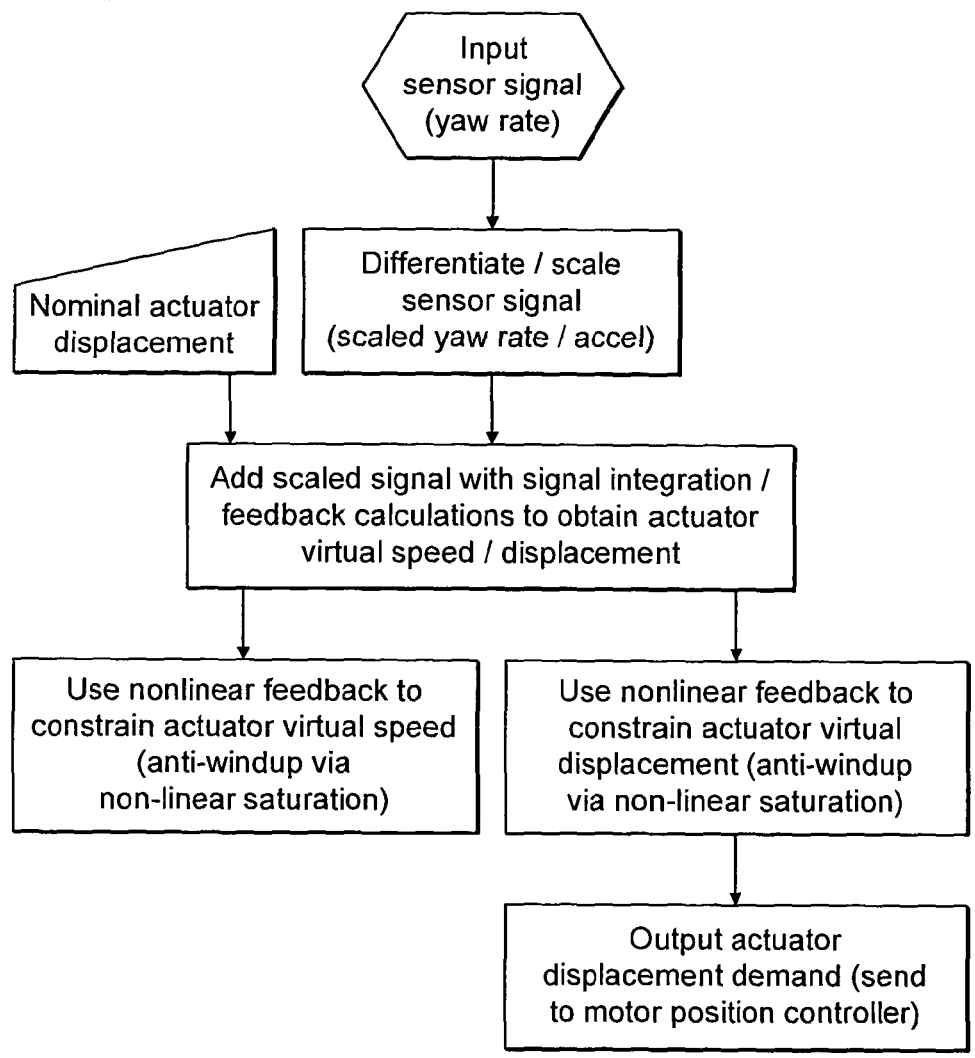
FIG. 18 is a flow diagram illustrating the scheme of FIG. 17.

A representation of the scheme of FIG. 17 in the form of a flow diagram is shown in FIG. 18. It will be appreciated that this is by way of example only and that a different approach may be taken in other embodiments. The parts of the flow diagram shown in parenthesis, in particular, are by way of example only.

In other embodiments, it is envisaged that the pitch rate and/or the roll rate and/or the bounce of the vehicle and/or the bounce of the wheels may be input to the scheme either together with or in substitution for the yaw rate. In other embodiments it is also envisaged that the parameter values of the control system may dynamically adapt according to the operating conditions of the vehicle, such as forward speed, lateral acceleration (cornering intensity) and longitudinal acceleration.

In a fifth embodiment, an example of an actuation arrangement 800 is provided that is for use with a double-wishbone suspension arrangement, similar to that shown in and described with reference to FIGS. 19a and 19b. The arrangement 800 of this fifth embodiment differs from the fourth embodiment, and is similar to a conventional arrangement, by the inboard end of the suspension strut not being coupled to a third wishbone.

Figure 19A:
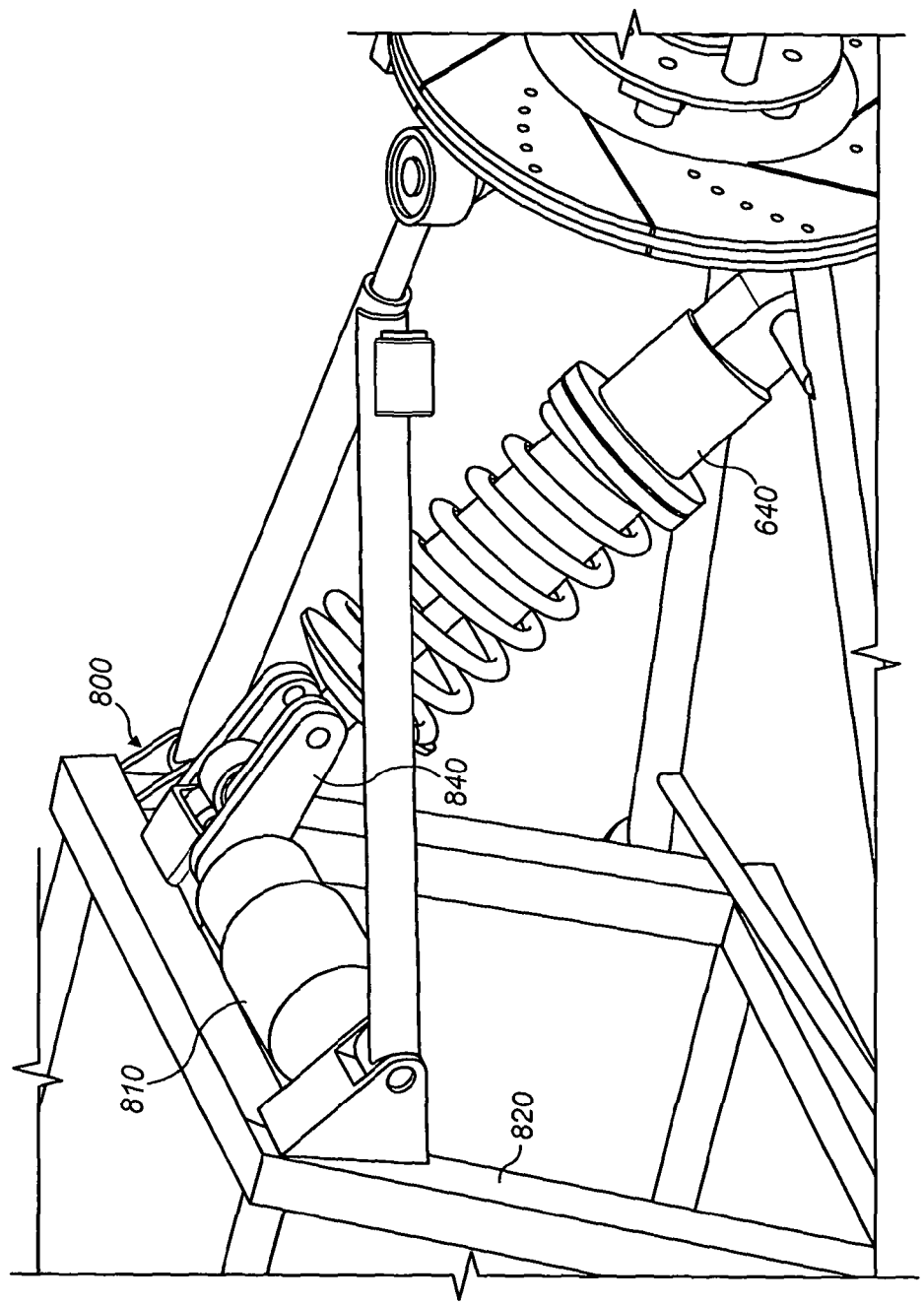
FIG. 19a is a perspective view of a fifth embodiment.

With reference to FIG. 19a, the actuation arrangement of this fifth embodiment includes a motor 810 connected to drive a casing 840 and connector rod arrangement. These will all now be described detail.

Figure 19B:
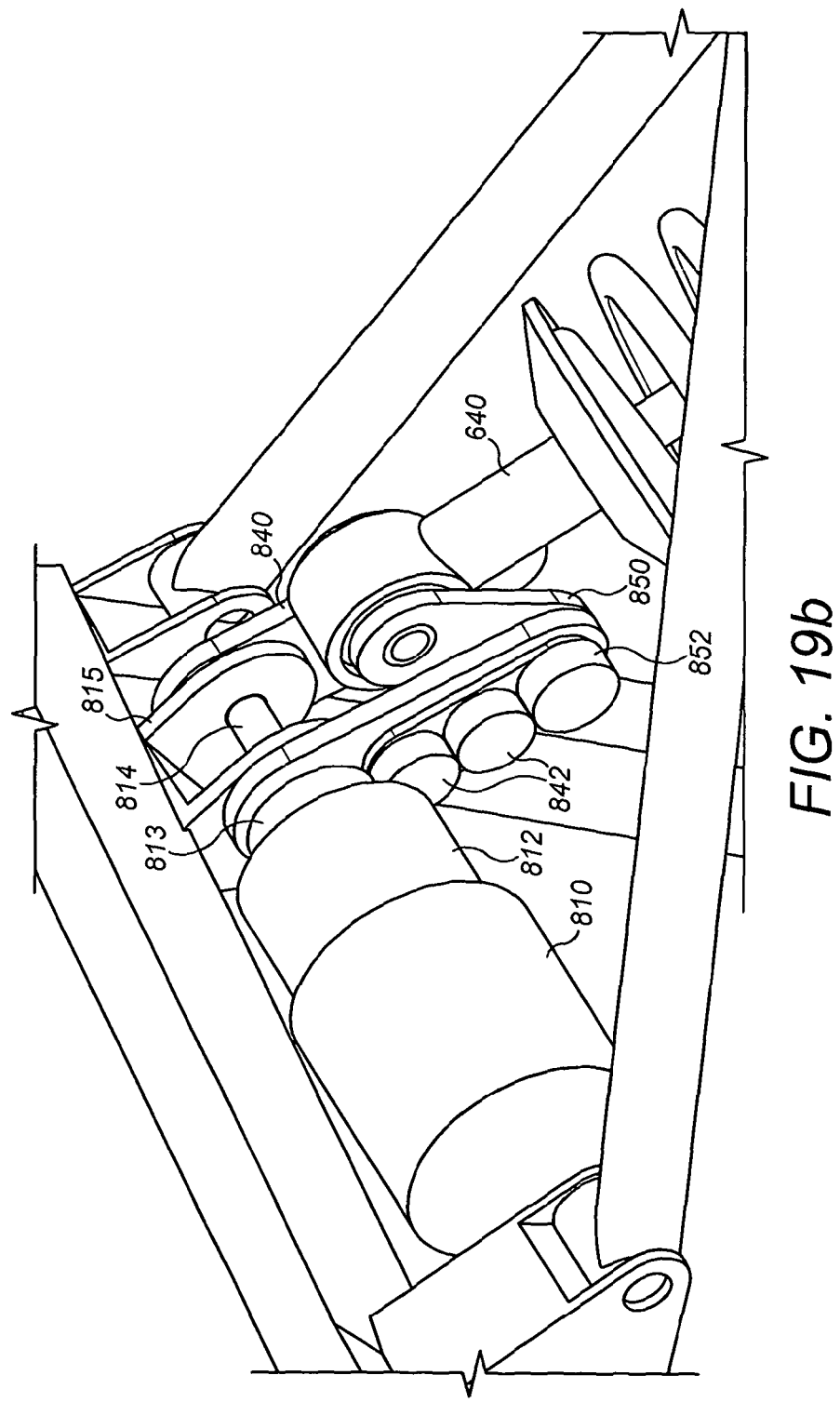
FIG. 19b is a detailed view of components of the fifth embodiment.

With reference to FIG. 19b, the motor 810 has a reducing gear arrangement 812 fixed thereto and to which the output shaft (not shown) of the motor 810 is coupled. At an output end of the gear arrangement 812, an annular gear wheel 813 is provided that is fixed to a housing of the gear arrangement 812, and therefore to the chassis 820. An output shaft 814 of the gear arrangement 812 passes through a hole in the centre of the annular gear wheel 813 and also passed through each of a pair of parallel, spaced apart, lug supports 815 that are fixed to the chassis 820. The output shaft 814 is rotatably journalled in the lug supports 815.

The casing 840 takes the form of two parallel spaced-apart arms. An inboard end of each arm is fixed to the output shaft 814 of the gear arrangement 812, so as to sandwich the lug supports 815 between those two arms. Thus, the casing 840 is pivotable with the output shaft 814 about the lug supports 815. The arm of the casing 840 that is adjacent the gear arrangement 812 carries two intermediate gears 842 mounted to that arm for rotation relative thereto. The two intermediate gears 842 mesh with each other, and that nearest the annular gear 813 meshes with that annular gear 813.

The connector rod 850 also takes the form of two parallel spaced-apart arms, each pivotally coupled to a respective one of the arms of the casing 840 at the outboard end of the casing 840. The arm of the connector rod 850 that is adjacent the arm of the casing 840 that carries the intermediate gears 842 has a connector rod gear 852 coupled thereto. The connector rod gear 852 meshes with the outboard one of the intermediate gears 842 and is fixed to the adjacent arm of the connector rod 850. The end of each arm of the connector rod 850 that is not coupled to the casing 840 is pivotally coupled to the second end of the suspension strut 640 such that the second end is sandwiched between the two arms of the connector rod 850.

Operating the motor 810 causes the shaft 814 of the gear arrangement 812 to rotate relative to the housing of the gear arrangement 812. As the shaft 814 is fixed to the casing 840, this also causes the casing 840 to rotate relative to the housing of the gear arrangement 812 and hence to rotate relative to the annular gear 813 that is fixed to that housing. This causes the intermediate gear 842 that meshes with the annular gear 813 to rotate, which in turn causes the other intermediate gear 842 and the connector rod gear 852 to rotate. Rotating the connector rod gear 852 in this way causes the connector rod 850 to rotate relative to the casing 840. The arrangement is such as to controllably compress or decompress the suspension strut 640. The actuation arrangement 800 may be controlled in accordance with a control system described hereinabove.

Figure 20:
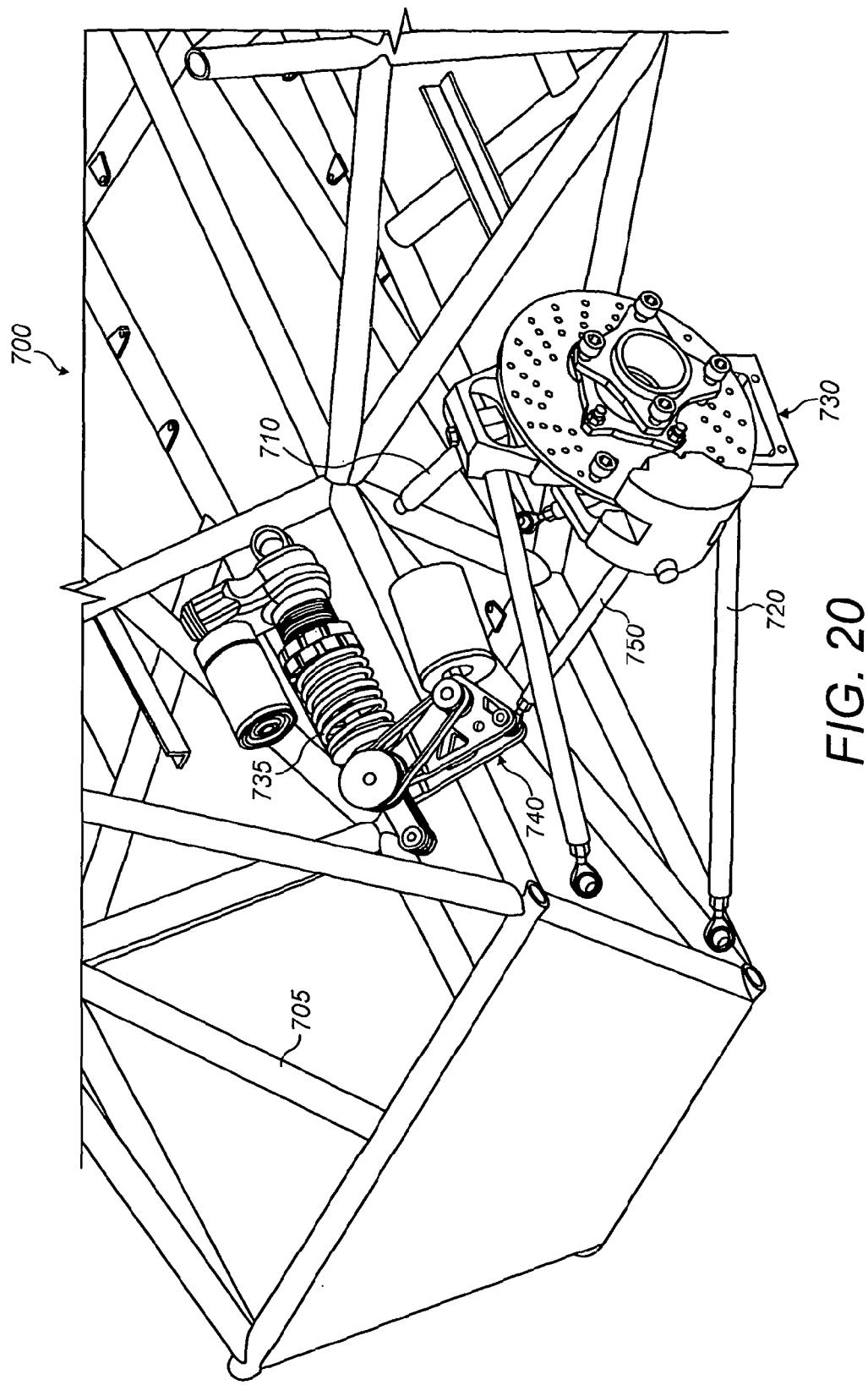
FIG. 20 is a perspective view of a sixth embodiment.

A sixth embodiment of a modified suspension arrangement is shown in FIG. 20. Again, in this embodiment, a variable geometry suspension arrangement 700 for a car is provided, the arrangement being, in similarity with that of the fifth embodiment, of the double-wishbone type. Upper 710 and lower 720 wishbones are therefore each connected at inboard ends to a chassis 705, and are connected at their outboard ends to a hub 730 for supporting a wheel.

The suspension arrangement 700 differs from a conventional wishbone arrangement in that a coil-over-damper suspension strut is not fitted between the chassis 705 and hub 730 or lower wishbone 720. Instead, a coil-over-damper suspension strut 735 is mounted inboard and is arranged with its axis generally parallel to the front-back centre-line of the chassis 705.

A first end of the suspension strut 735 is pivotally mounted to the chassis 705. The second end of the suspension strut 735 is pivotally coupled to an intermediate arrangement 740 that is also pivotally mounted on the chassis 705. Also pivotally coupled to the intermediate arrangement 740 is one end of a plain strut 750, the other end of which is pivotally coupled to the outboard end of the lower wishbone 720. The overall arrangement is such that the intermediate arrangement 740 acts as a pivotable lever mounted on the chassis 705 to couple the plain strut 750 to the suspension strut 735, and such that movement of the plain strut 750 resulting from upward and downward movement of the wheel hub 730 is translated by the intermediate arrangement 740 pivoting on its mounting to compress and extend the suspension strut 735. In this way, the chassis 705 is suspended.

The intermediate arrangement 740 is not however fixed, and is instead arranged to vary the geometry of the suspension arrangement 700. This will now be explained.

Figure 21:
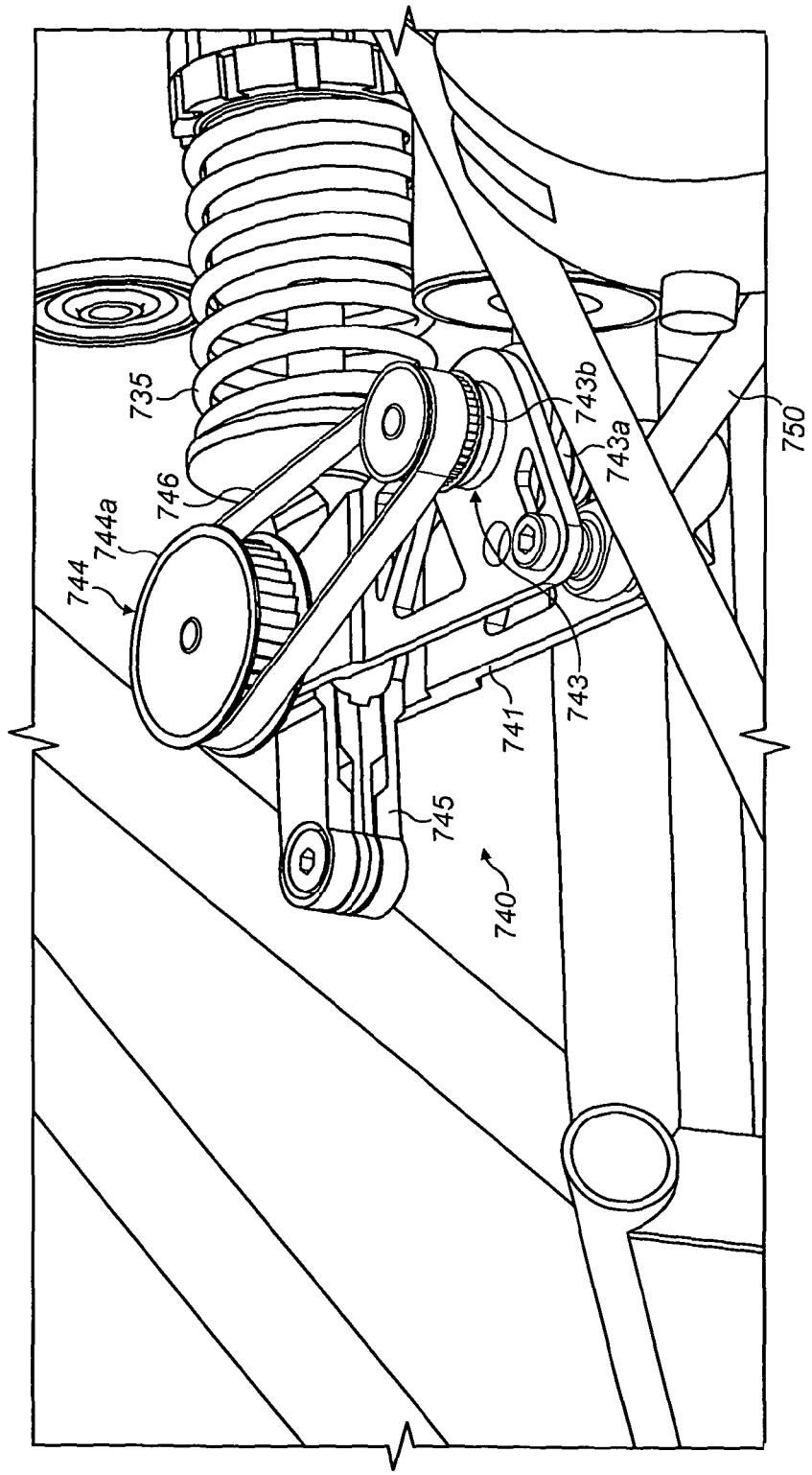
FIG. 21 is a detailed view of components of the sixth embodiment in a first position.

With reference to FIG. 21, the intermediate arrangement 740 is made up of several components: a frame 741, a motor 742, a first gear mechanism 743, a second gear mechanism 744 and a connecting rod 745. Each will now be described.

The frame 741 is formed of two spaced-apart plates of steel. Each plate is generally the same as the other and approximates to a right-angled triangle. The frame 741 is mounted to the chassis 705 by pivotally mounting a lower one of the plates adjacent the right-angled corner thereof.

The motor 742 is mounted the chassis 705. An output shaft of the motor 742 extends between the two plates of the frame 741, adjacent the corner that is mounted to the chassis 705, and carries a first bevel gear (not shown).

The first gear mechanism 743 is made up of a second bevel gear 743a and a first belt gear 743b both mounted on a shaft pivotally mounted in the upper plate adjacent the right-angled corner thereof, with gears 743a, 743b either side of the upper plate and the second bevel gear 743a meshing with the first bevel gear.

The second gear mechanism 744 is made up of a second belt gear 744a that is mounted in an inboard one of the two non-right-angled corners of the upper plate.

A belt 746 couples the first 743b and second 744a belt gears to each other.

The connecting rod 745 consists of two portions pivotally connected at one end to a respective one of the plates at the inboard non-right-angled corner thereof and so as to be between the two plates. The connecting rod is coupled at that one end to the second gear mechanism 744 to be rotatable thereby. The other ends of the two portions of the connecting rod 745 are pivotally connected to the second end of the suspension strut 735 such that the second end of the suspension strut 735 is between the two portions of the connecting rod 745.

An outboard non-ninety-degree corner of the frame 741 receives the inboard end of the plain strut 750.

Figure 22:
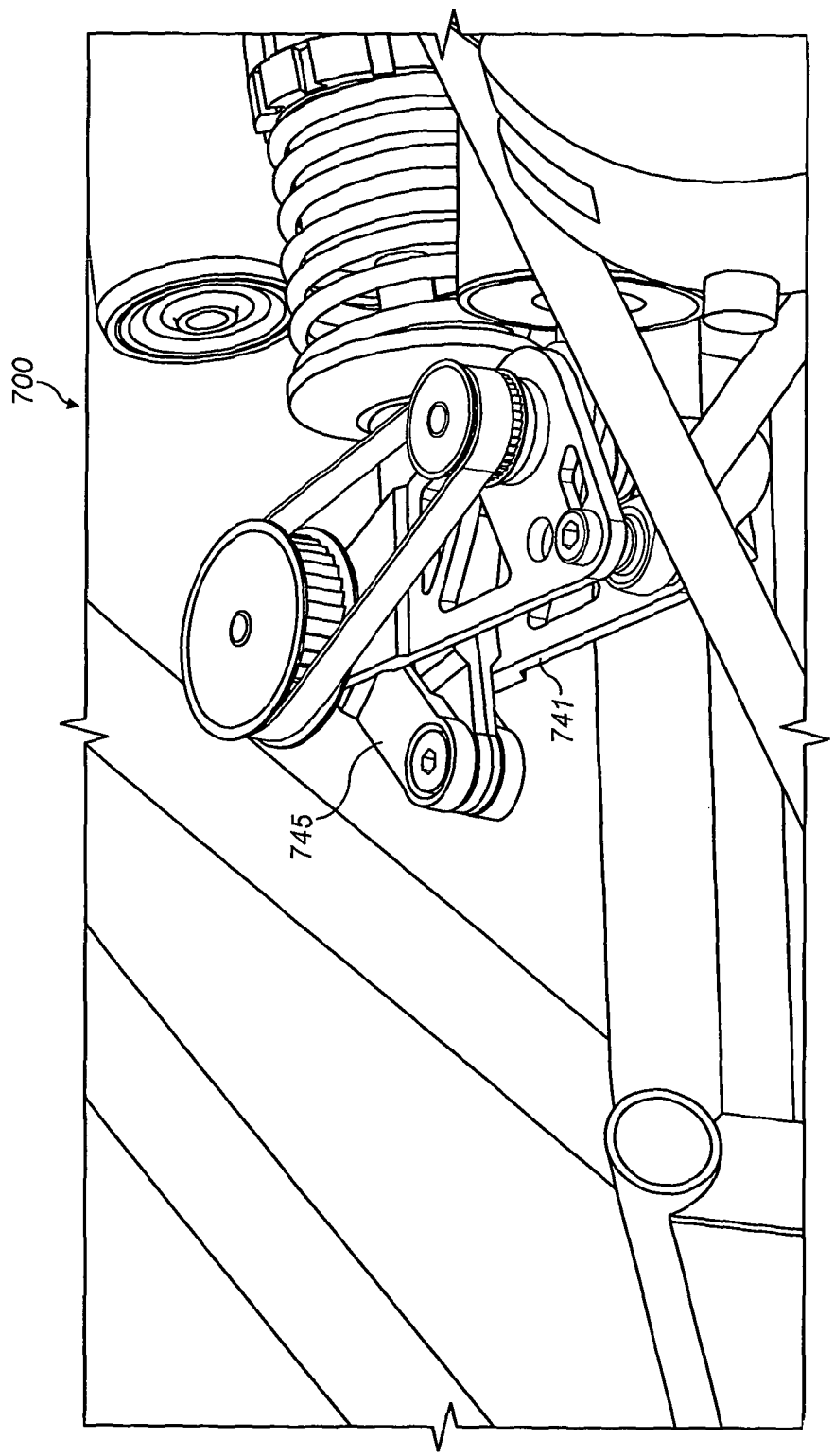
FIG. 22 is a detailed view of the components of the sixth embodiment in a second position.

In operation, the motor is operated in accordance with, for example, a control system described hereinabove to drive the second bevel gear 743a and hence the first belt gear 743b. The first belt gear 743b is coupled by the belt 746 to the second belt gear 744a and so causes that gear to be driven. Driving the second belt gear 744a drives the reducing mechanism to rotate the connecting rod 745 relative to the frame 741. As can be seen in FIG. 22, rotating the connecting rod varies the geometry of the suspension arrangement 700 in a manner analogous to that in other embodiments already described.

An alternative version of the sixth embodiment described above with reference to FIGS. 20 to 22 will now be described with reference to FIG. 23. In this version, the intermediate arrangement 740 is replaced with a variable butterfly arrangement 900. The butterfly arrangement 900 includes two generally triangular wing portions 910, 920. Each wing portion 910, 920 is pivotally attached at a respective corner to each other and to the chassis 705 such that one wing portion 910 is generally inboard of that pivot point and the other wing portion 920 is generally outboard of that pivot point. In this way, the two wing portions 910, 920 are pivotally moveable relative to each other, the pivot axis being substantially perpendicular to the plane of each wing portion 910, 920. A corner of each wing portion 910, 920 is connected to the respective other portion by a two-piece connector 930, the two pieces being pivotally connected to each other with a pivot axis substantially parallel to that of the pivot connecting the wing portions 910, 920 to the chassis 705.

The remaining corner of the inboard wing portion 910 is pivotally connected to the second end of the suspension strut 735. The remaining corner of the outboard wing portion 920 is pivotally connected to the inboard end of the plain strut 750 (not shown in FIG. 23).

Although not shown, it is envisaged that a suitable actuator be connected to the two-piece connector 930 to move the pivot point thereof towards and away from the pivot point by which the wing portions 910, 920 are connected together and to the chassis 705. This has the effect of varying the distance between the second end of the suspension strut 735 and the inboard end of the plain strut 750, and also varies the relative angular position of the two wing portions 910, 920, thereby altering the geometry of the arrangement. Again, the actuation may be controlled in accordance with the control system described hereinabove.

Figure 24A:
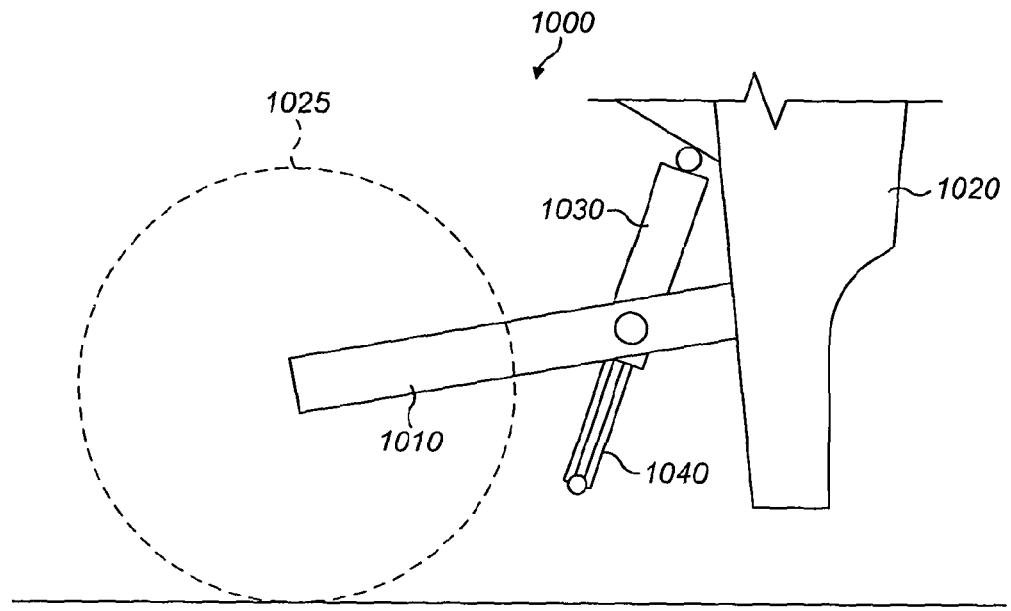
FIG. 24a is a schematic view of a seventh embodiment.

FIG. 24a shows in schematic form a seventh embodiment. This embodiment provides variable-geometry suspension apparatus for a motorbike and so is similar to the first and third embodiments shown in and described with reference to FIGS. 2 to 14. However, whereas those embodiments relied on various forms of linear actuation to vary the geometry of the suspension, the present embodiment applies a torque between components of the suspension, or between the chassis and one or more components of the suspension, in order to vary the geometry of the suspension. It is envisaged that, at least in certain arrangements, applying a torque effectively is more convenient than is effectively carrying out linear displacement.

With reference to FIG. 24a, the variable-geometry suspension arrangement 1000 of this arrangement includes a conventional swing arm 1010 that is mounted in a conventional way to a main frame 1020. A first end of a coil-over-damper suspension strut 1030 is mounted in a conventional way to the frame 1020. However, a second end of the suspension strut 1030 is pivotally coupled to a suspension link 1040 that is, in turn, pivotally coupled to the swing arm 1010. The suspension link 1040 is coupled to the swing arm at a position spaced away from the connection between the swing arm 1010 and the frame 1020, toward the rear wheel 1025. Although not shown, an actuator mechanism is provided that is operable to vary the angle between the suspension link 1040 and the swing arm 1010. It is envisaged that almost any form of actuator that is operable to apply a torque between these two components may be used. In particular, however, an electromechanical arrangement is envisaged, such as similar to that used in the fifth and sixth embodiments.

Figure 24B:
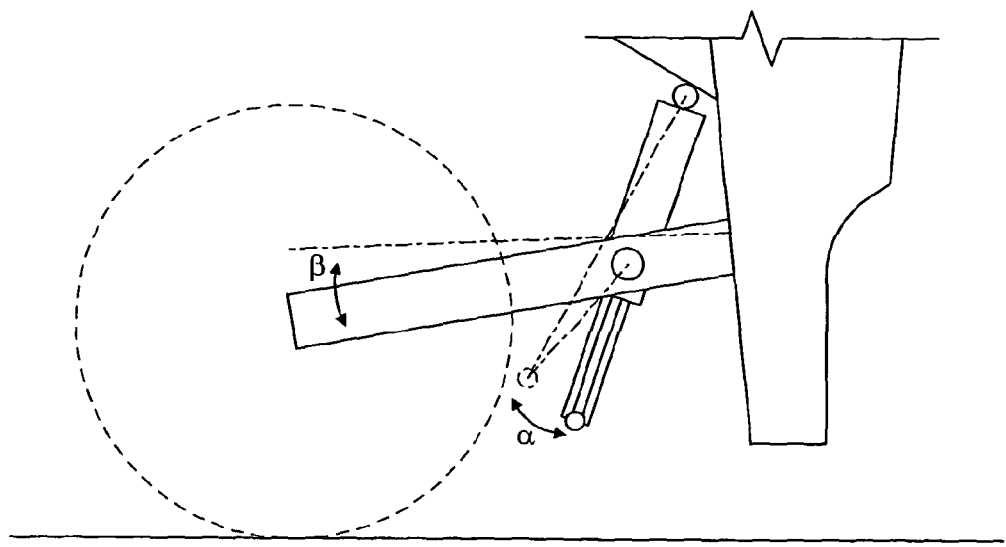
FIG. 24b is similar to FIG. 24a but shows in dashed lines movement of certain components to a second position.

FIG. 24b shows how the suspension link 1040 can be rotated relative to the swing arm 1010 under the action of the actuator. The second end of the suspension strut 1030 can be seen to be moved through an angle α. The consequence of this is to compress further the suspension strut and also to change the motion ration between the wheel movement and the suspension strut. Thus, the geometry of the suspension can be varied.

It is envisaged that the apparatus of this embodiment may also be controlled in accordance with a control system as disclosed herein.

Figure 25:
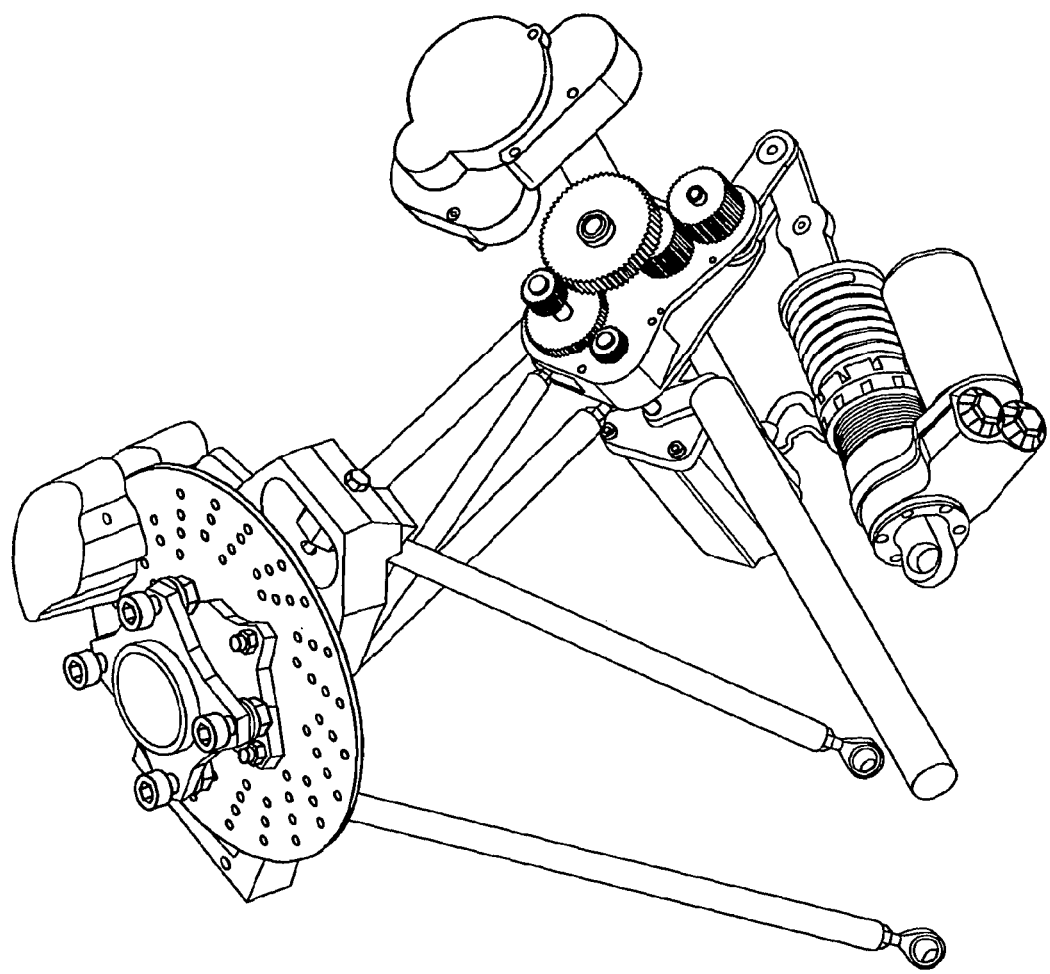
FIG. 25 is an alternative version of the sixth embodiment.
Figure 26A:
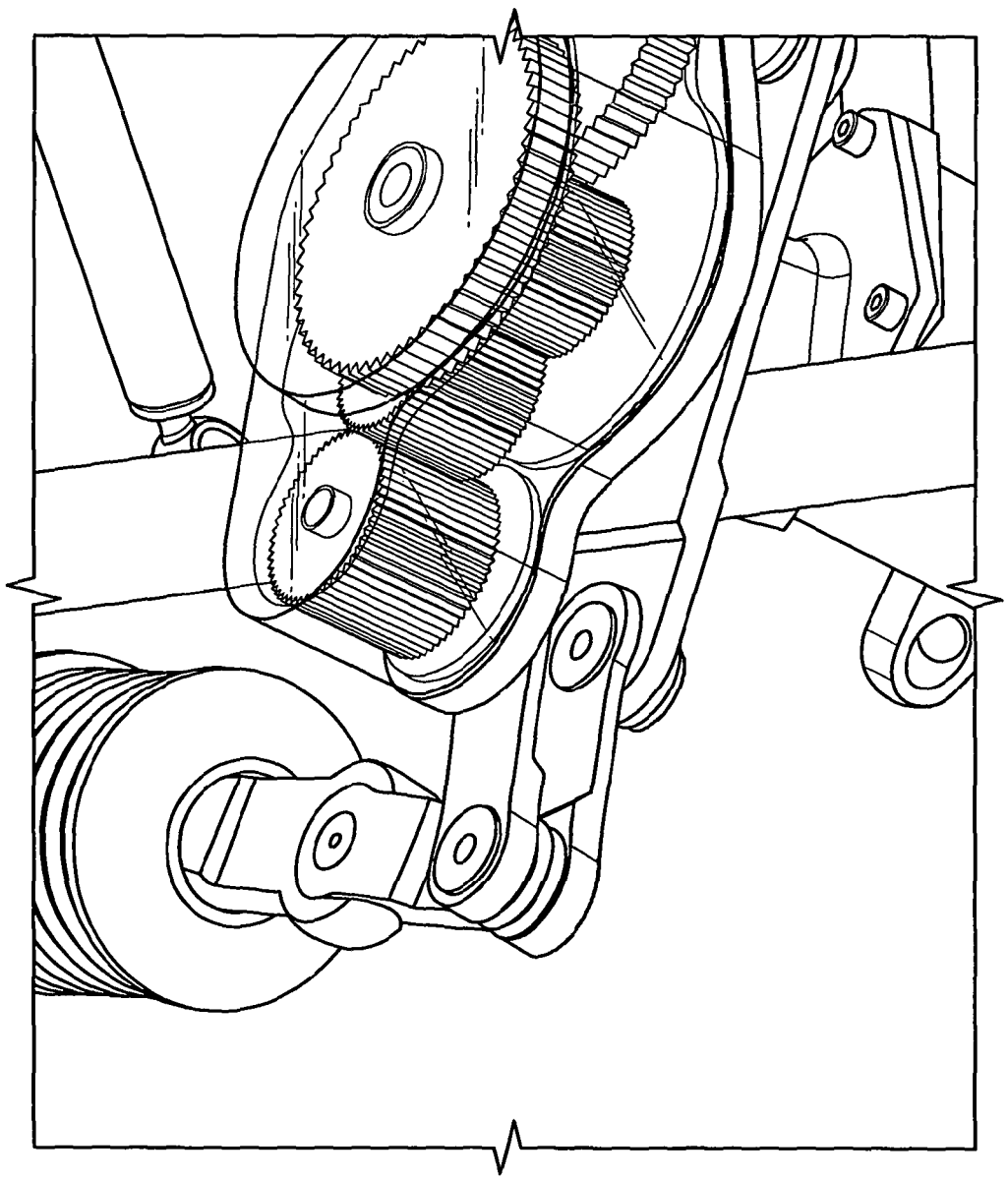
FIGS. 26a, 26b, and 26c show how actuation of a spur gear arrangement of FIG. 25 varies the geometry of the suspension.
Figure 26B:
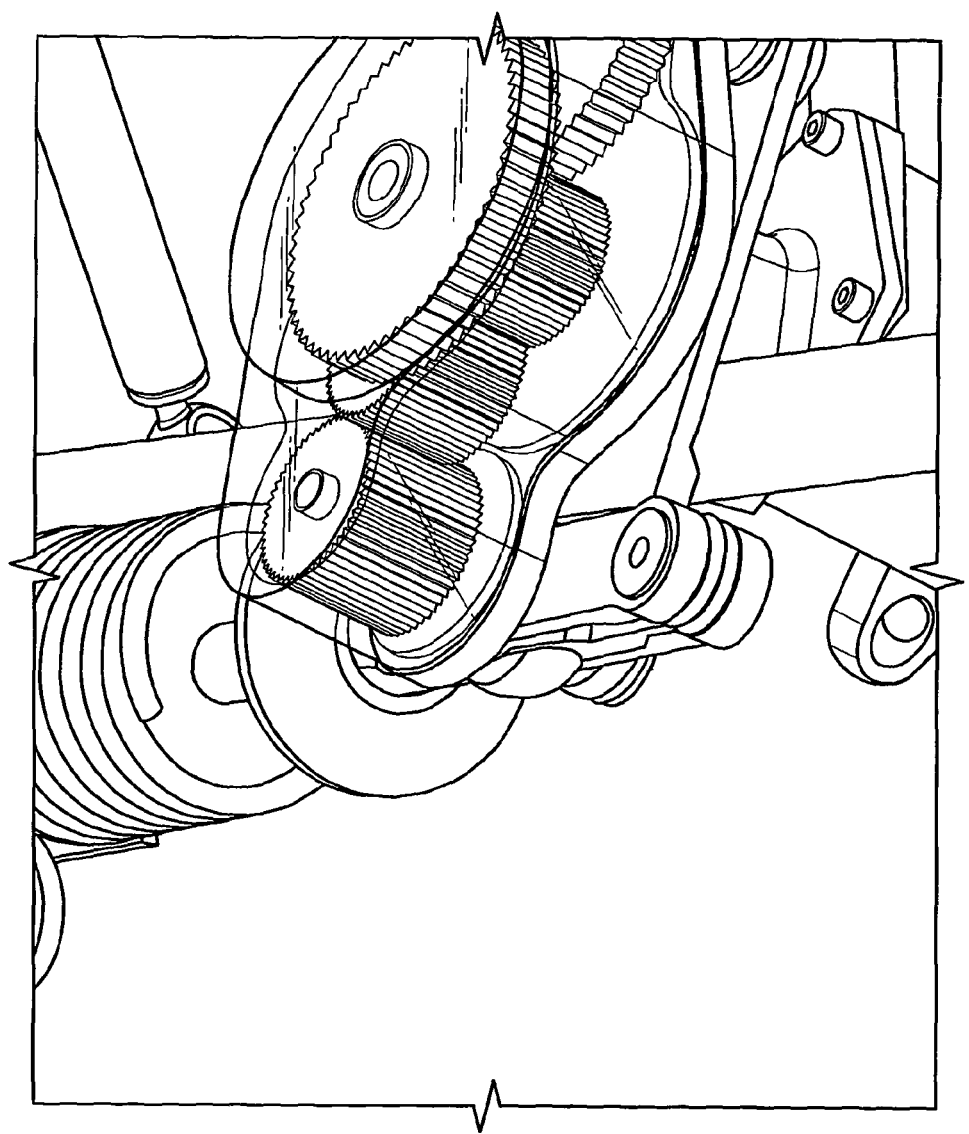
Figure 26C:
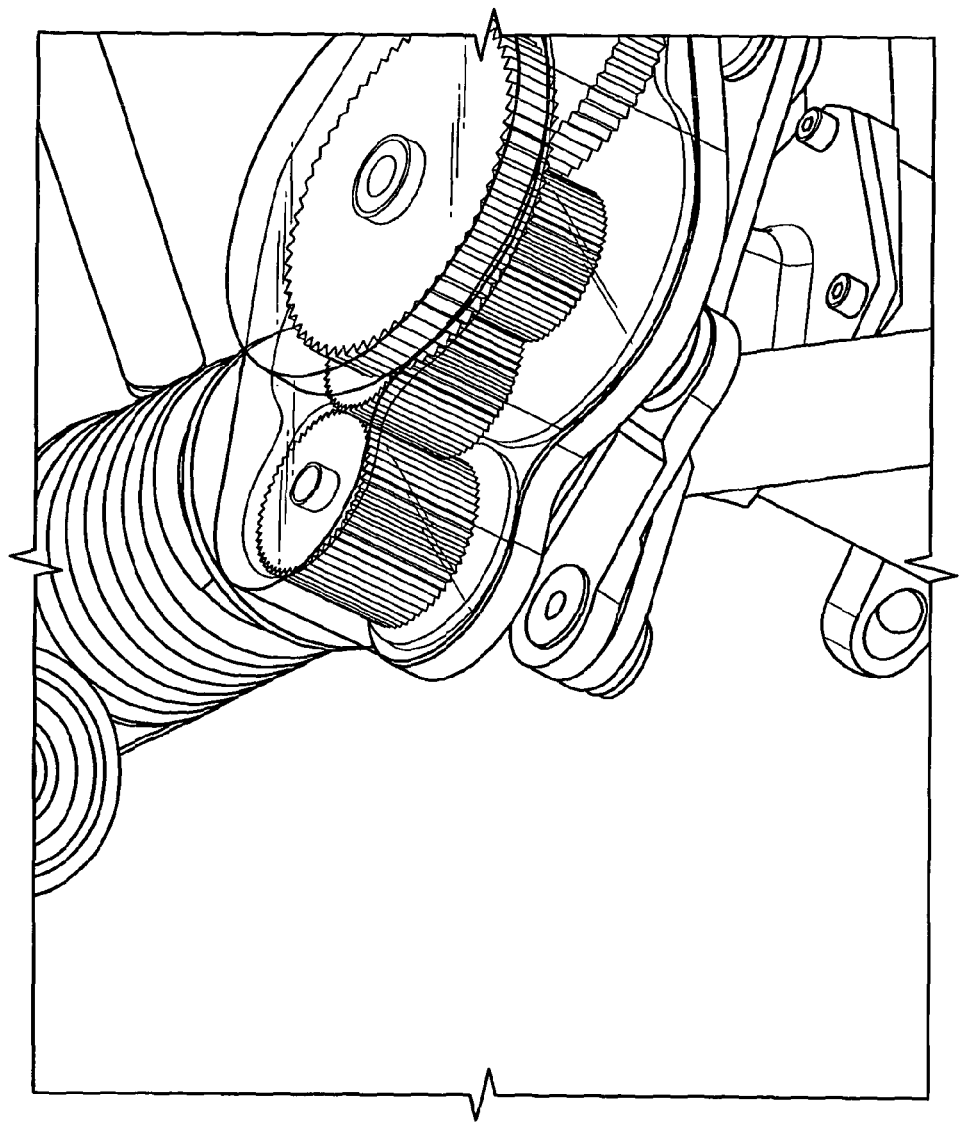

An alternative version of the sixth embodiment is shown in FIG. 25. In this alternative version, a spur gear arrangement is substituted for the bevel gear and belt arrangement in the previously-described version of the sixth embodiment. FIGS. 26a, 26b and 26c show how actuation of the arrangement varies the geometry of the suspension.

The invention claimed is:

1. A variable-geometry suspension apparatus for a vehicle, the apparatus comprising a resiliently compressible member, an actuator, an intermediate structure, and a support structure, wherein:
the resiliently compressible member is mounted to the support structure for compression under the weight of a mass suspendable by the apparatus;
the compressible member is mounted with at least one end of the compressible member displaceable in a displacement direction having a component perpendicular to the direction of compression, so that such displacement varies the geometry of the suspension apparatus and thereby varies the compression of the compressible member;
the intermediate structure is coupled to the at least one end of the compressible member; and
the actuator is arranged to engage and move the intermediate structure to displace the at least one end of the compressible member in the displacement direction and thereby vary the geometry and the compression.

2. The apparatus according to claim 1, wherein the compressible member is mounted to the support structure, and the support structure is arranged, such that movement in the displacement direction compresses or extends the compressible member.

3. The apparatus according to claim 1, wherein the compressible member is mounted to the support structure and the support structure is arranged to function as passive suspension apparatus without operation of the actuator.

4. The apparatus according to claim 1, wherein the actuator is arranged to vary the position of the compressible member relative to the support structure.

5. The apparatus according to claim 1, wherein the actuator is arranged to vary the position of the one end of the compressible member relative to the support structure.

6. The apparatus according to claim 1, wherein the support structure comprises a four-bar linkage, a first bar of the linkage for coupling to a wheel of the vehicle and a second bar of the linkage for coupling to, or constituted by part of, the vehicle chassis, one end of the compressible member coupled to a bar of the four-bar linkage, the other end of the compressible member coupled to the chassis, the actuator acting to vary the position of the one end of the compressible member along the bar of the four-bar linkage to which it is coupled, thereby displacing that one end.

7. The apparatus according to claim 1, wherein the support structure forms at least part of a double-wishbone suspension arrangement, a first end of the compressible member coupled to one wishbone, a second end of the compressible member coupled to the second wishbone by moveable means, the actuator arranged to act on the moveable means to displace the second end of the compressible member.

8. The apparatus according to claim 1, wherein the actuator is an electrical actuator, and optionally comprises an electric motor.

9. The apparatus according to claim 1, wherein the actuator comprises means to convert rotary motion into linear motion, such as a ball screw arrangement to which the output shaft of the motor is coupled and/or a worm gear arrangement to which the output shaft of the motor is coupled.

10. The apparatus according to claim 1, wherein the actuator and at least part of the support structure are arranged for fitting to existing suspension apparatus in substitution for part thereof.

11. The apparatus according to claim 1, wherein the one end of the compressible member is pivotally coupled to one end of a con-rod, the con-rod being pivotal about its other end under action of the actuator to displace the one end in the displacement direction.

12. A vehicle comprising suspension apparatus according to claim 1.

13. A method of operating a variable-geometry suspension apparatus for a vehicle, the apparatus having a resiliently compressible member, an actuator and support structure, wherein: the resiliently compressible member is mounted to the support structure for compression under the weight of a mass suspendable by the apparatus, and wherein: the compressible member is mounted with at least one end of the compressible member displaceable in a displacement direction having a component perpendicular to the direction of compression, so that such displacement varies the geometry of the suspension apparatus and thereby varies the compression of the compressible member; and the actuator is arranged for displacing the end of the compressible member in the displacement direction to vary the geometry and thereby vary the compression, the method comprising the steps of:
a) receiving at least one signal indicative of one or more of the wheel bounce and yaw, pitch, roll and bounce of a vehicle to which the apparatus is fitted; and
b) applying a transfer function to the at least one signal to generate a measure of the desired displacement of the at least one end of the resiliently compressible member, wherein the transfer function comprises:
i) a displacement saturation function to limit the displacement between limits;
and/or
ii) a velocity saturation function to limit the rate of change of displacement between limits.

14. The method according to claim 12, wherein the displacement saturation function is substantially of the form:

$$d_a = \left(-\frac{1}{\pi}\arctan(s_c(\bar{d}_a - d_{amax})) + \frac{1}{\pi}\arctan(s_c(\bar{d}_a - d_{amin}))\right)\bar{d}_a +$$
$$\left(\frac{1}{\pi}\arctan(s_c(\bar{d}_a - d_{amax})) + \frac{1}{2}\right)d_{amax} -$$
$$\left(\frac{1}{\pi}\arctan(s_c(\bar{d}_a - d_{amin})) - \frac{1}{2}\right)d_{amin}$$

wherein: $d_a$ is the saturated variable geometry displacement; $\hat{d}_a$ is the unconstrained displacement output; and $s_c$ is a shaping constant that determines the sharpness of the transition between non-saturation and saturation.

15. The method according to claim 12, wherein the velocity saturation function is substantially of the form:

$$\hat{v}_a = v_a - \begin{bmatrix} \left(-\frac{1}{\pi}\arctan(s_c(v_a - v_{amax})) + \\ \frac{1}{\pi}\arctan(s_c(v_a - v_{amin}))\right)v_a + \\ \left(\frac{1}{\pi}\arctan(s_c(v_a - v_{amax})) + \frac{1}{2}\right)v_{amax} - \\ \left(\frac{1}{\pi}\arctan(s_c(v_a - v_{amin})) - \frac{1}{2}\right)v_{amin} \end{bmatrix}$$

wherein: $\hat{v}_a$ is the saturated actuator velocity; $v_a$ is the actuator velocity; and $s_c$ is a shaping constant that determines the sharpness of the transition between non-saturation and saturation.

16. A variable-geometry suspension apparatus for a vehicle, the apparatus comprising a resiliently compressible member, an actuator and support structure, wherein:
the resiliently compressible member is mounted to the support structure for compression under the weight of a mass suspendable by the apparatus,
and wherein:
the compressible member is mounted with at least one end of the compressible member displaceable in a displacement direction having a component perpendicular to the direction of compression, so that such displacement varies the geometry of the suspension apparatus and thereby varies the compression of the compressible member;
the actuator is arranged for displacing the end of the compressible member in the displacement direction to vary the geometry and thereby vary the compression; and
the support structure forms at least part of a double-wishbone suspension arrangement, a first end of the compressible member coupled to one wishbone, a second end of the compressible member coupled to the second wishbone by moveable means, the actuator arranged to act on the moveable means to displace the second end of the compressible member.

17. The apparatus according to claim 1, wherein the intermediate structure comprises a shoe fitted to the at least one end of the compressible member.

18. The apparatus according to claim 1, wherein the intermediate structure comprises a carriage pivotally coupled to the at least one end of the compressible member.

19. The apparatus according to claim 1, wherein the intermediate structure comprises a frame formed of two spaced-apart plates.

* * * * *